US012485437B2

(12) United States Patent
Fujii et al.

(10) Patent No.: US 12,485,437 B2
(45) Date of Patent: Dec. 2, 2025

(54) SPRAY IONIZATION DEVICE, ANALYSIS DEVICE, AND SURFACE COATING DEVICE

(71) Applicant: National Institute of Advanced Industrial Science and Technology, Tokyo (JP)

(72) Inventors: Shinichiro Fujii, Tsukuba (JP); Kazumi Inagaki, Tsukuba (JP); Shinichi Miyashita, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 857 days.

(21) Appl. No.: 17/608,811

(22) PCT Filed: Apr. 15, 2020

(86) PCT No.: PCT/JP2020/016540
§ 371 (c)(1),
(2) Date: Nov. 4, 2021

(87) PCT Pub. No.: WO2020/241098
PCT Pub. Date: Dec. 3, 2020

(65) Prior Publication Data

US 2022/0305505 A1 Sep. 29, 2022

(30) Foreign Application Priority Data

May 24, 2019 (JP) ................................. 2019-097836

(51) Int. Cl.
*B05B 5/03* (2006.01)
*B05B 5/00* (2006.01)
*B05B 5/053* (2006.01)

(52) U.S. Cl.
CPC ................ *B05B 5/03* (2013.01); *B05B 5/001* (2013.01); *B05B 5/0533* (2013.01)

(58) Field of Classification Search
CPC ......... B05B 5/03; B05B 5/001; B05B 5/0533; B05B 7/066; H01J 49/045; H01J 49/167; H01J 49/165
See application file for complete search history.

(56) References Cited

U.S. PATENT DOCUMENTS 4,018,973 A * 4/1977 Paton ...................... F27D 11/08 373/21
4,575,609 A * 3/1986 Fassel .................... B23K 10/00 239/424.5

(Continued)

FOREIGN PATENT DOCUMENTS

GB 2456131 A 7/2009
JP H06-310088 A 11/1994

(Continued)

OTHER PUBLICATIONS

E. Jane Maxwell et al "Twenty years of interface development for capillary electrophoresis-electrospray ionization-mass spectrometry", Analytica Chimica Acta, Elsevier, Amsterdam, NL, vol. 627, No. 1, Oct. 3, 2008, pp. 25-33. (cited in the Nov. 22, 2022 Office Action issued for EP20813374.4).

*Primary Examiner* — Joseph A Greenlund
(74) *Attorney, Agent, or Firm* — Troutman Pepper Locke LLP; James E. Armstrong, IV; Nicholas J. DiCeglie, Jr.

(57) ABSTRACT

Provided in the present disclosure is a spray ionization device comprising: a first tube that has a first flow path in which a liquid can flow, the first tube having a first outlet on one end thereof from which the liquid is sprayed; a second tube that surrounds the first tube with a gap therebetween and has a second flow path in which a gas can flow, the second tube having a second outlet on the one end thereof (Continued)

and the second flow path being defined by the outer peripheral surface of the first tube and the inner peripheral surface of the second tube; and an electrode contacting the liquid flowing through the first flow path, the electrode being able to apply a voltage to the liquid by means of a power source connected to the electrode, wherein charged droplets of the liquid can be sprayed from the second outlet.

15 Claims, 15 Drawing Sheets

(56) References Cited

U.S. PATENT DOCUMENTS

| | | | | |
|---|---|---|---|---|
| 4,775,774 | A * | 10/1988 | Caneer, Jr. | H05H 1/3405 219/121.54 |
| 5,992,244 | A * | 11/1999 | Pui | B01J 19/088 73/865.5 |
| 6,140,640 | A | 10/2000 | Wittmer et al. | |
| 6,586,731 | B1 * | 7/2003 | Jolliffe | H01J 49/049 250/281 |
| 7,145,137 | B2 * | 12/2006 | Montaser | H01J 49/105 250/288 |
| 7,671,329 | B2 * | 3/2010 | Sakata | H01J 49/105 250/281 |
| 7,960,711 | B1 * | 6/2011 | Sheehan | H01J 49/165 250/493.1 |
| 8,272,576 | B2 * | 9/2012 | Doak | B05B 7/0475 239/128 |
| 8,772,709 | B2 * | 7/2014 | Moeller | H01J 49/167 250/281 |
| 8,809,777 | B2 * | 8/2014 | Bajic | G01N 30/724 250/288 |
| 9,165,751 | B1 * | 10/2015 | Schleifer | G01N 1/28 |
| 9,768,004 | B2 * | 9/2017 | Fogwill | H01J 49/10 |
| 11,705,318 | B2 * | 7/2023 | Bajic | H01J 49/167 250/282 |
| 11,826,770 | B2 * | 11/2023 | Inagaki | G01N 21/714 |
| 11,944,993 | B1 * | 4/2024 | Burgener | B05B 7/0815 |
| 2009/0250608 | A1 * | 10/2009 | Mordehai | H01J 49/167 250/288 |
| 2010/0072394 | A1 | 3/2010 | Kertesz et al. | |
| 2014/0023856 | A1 * | 1/2014 | Bisges | C23C 4/12 428/328 |
| 2014/0353495 | A1 * | 12/2014 | Inagaki | H01J 49/105 239/398 |
| 2015/0206729 | A1 * | 7/2015 | Inagaki | H01J 49/045 250/288 |
| 2017/0025262 | A1 * | 1/2017 | Xu | G01N 27/447 |
| 2020/0234940 | A1 * | 7/2020 | Fukui | H01J 49/165 |
| 2021/0210320 | A1 * | 7/2021 | Bajic | H01J 49/045 |
| 2022/0001405 | A1 * | 1/2022 | Inagaki | B05B 5/03 |
| 2022/0305505 | A1 * | 9/2022 | Fujii | B05B 7/066 |
| 2023/0051469 | A1 * | 2/2023 | Fujii | B05B 5/001 |
| 2023/0063626 | A1 * | 3/2023 | Fujii | B05B 7/066 |

FOREIGN PATENT DOCUMENTS

| | | | | |
|---|---|---|---|---|
| JP | 2005-190767 | A | | 7/2005 |
| JP | 2005197141 | A | * | 7/2005 |
| JP | 2013-130492 | A | | 7/2013 |
| WO | 2019/053851 | A1 | | 3/2019 |
| WO | 2019/065405 | A1 | | 4/2019 |

* cited by examiner

TO HIGH-VOLTAGE POWER SOURCE 14

TO HIGH-VOLTAGE POWER SOURCE 14

SPRAY IONIZATION DEVICE, ANALYSIS DEVICE, AND SURFACE COATING DEVICE

TECHNICAL FIELD

The present invention relates to a spray ionization device and an analysis device.

BACKGROUND ART

A mass spectrometer can count ions constituting a substance by each mass-to-charge ratio to obtain ionic strength which is quantitative information on the substance. The mass spectrometer can perform more accurate analysis by obtaining ionic strength having a favorable signal-to-noise ratio. Therefore, an analysis target, which is an ionized or charged material, needs to be sufficiently introduced.

Examples of a method of ionizing a liquid sample include an electrospray ionization method. With the electrospray ionization method, high voltage of several kilovolts is applied to a sample solution in a narrow tube, a liquid cone (so-called Taylor cone) is formed at the tip of an outlet, electrically charged droplets are ejected from the tip, solvents evaporate to reduce the volume of the electrically charged droplets, and the droplets finally split apart to generate gas-phase ions. This method can form electrically charged droplets at a rate of ejecting 1 to 10 μL/min of solution, in which the eject rate is not sufficient for use in conjunction with a liquid chromatography method.

A gas spray assisted electrospray ionization method (see, for example, U.S. Pat. No. 8,809,777) may be an example of a method for supporting generation of electrically charged droplets and vaporization of solvents by ejecting a gas from an outer tube surrounding a narrow tube of a sample solution, in order to promote vaporization of electrically charged droplets.

Patent Document 1: U.S. Pat. No. 8,809,777, Specification

DISCLOSURE OF THE INVENTION

Problems to be Solved by the Invention

However, the gas spray assisted electrospray ionization method as disclosed in U.S. Pat. No. 8,809,777 generates electrically charged droplets having a large particle size; therefore, there is a need to use techniques such as promoting vaporization of solvents by using a heated gas, atomizing electrically charged droplets by collision with a plate-shaped target, or making the ejection direction orthogonal to the direction of introducing the atomized and electrically charged droplets in order to remove excessively large electrically charged droplets; as a result, electrically charged droplets cannot be efficiently obtained, which has been a problem.

An object of the present invention is to solve the aforementioned problems and provide a spray ionization device capable of efficiently obtaining atomized and electrically charged droplets to be ejected, and an analysis device and a surface coating device including the same.

Means for Solving the Problems

One aspect of the present invention provides a spray ionization device, including: a first tube including a first channel through which a liquid can flow, the first tube including a first outlet for ejecting the liquid at one end; a second tube surrounding the first tube with a gap and including a second channel through which a gas can flow, the second tube including a second outlet at the one end, the second channel being defined by an outer circumferential surface of the first tube and an inner circumferential surface of the second tube; and an electrode that can contact the liquid flowing through the first channel, the electrode capable of applying voltage to the liquid by way of a power source connected to the electrode, in which at the one end, the second outlet is arranged further toward a tip than the first outlet, at least a portion of the inner circumferential surface of the second tube has a diameter that progressively decreases toward the second outlet, and a diameter of the inner circumferential surface of the second outlet is equal to or greater than an opening diameter of the first outlet, and electrically charged droplets of the liquid can be ejected from the second outlet.

According to the aforementioned aspect, the flow of droplets of the liquid ejected from the first outlet of the first tube focuses while being enveloped in the gas flowing through the second channel of the second tube. As a result, droplets of the liquid can be prevented from contacting the inner circumferential surface of the second tube near the first outlet of the first tube, whereby clogging can be avoided. The flow of droplets of the ejected liquid focuses by the gas, whereby the droplets are atomized. The electrode applies voltage to the liquid, whereby the ejected and atomized droplets are electrically charged. Therefore, a spray ionization device, which is capable of efficiently obtaining atomized and electrically charged droplets to be ejected, can be provided.

Another aspect of the present invention provides a spray ionization device, including: a first tube including a first channel through which a liquid can flow, the first tube including a first outlet for ejecting the liquid at one end; a second tube surrounding the first tube with a gap and including a second channel through which a gas can flow, the second tube including a second outlet arranged further toward a tip than the first outlet at the one end, the second channel being defined by an outer circumferential surface of the first tube and an inner circumferential surface of the second tube; an electrode that can contact the liquid flowing through the first channel, the electrode capable of applying voltage to the liquid by way of a power source connected to the electrode; and a reticulated member covering the second outlet, or an opening provided to the second tube between the first outlet and the second outlet, the opening being narrower than an opening of the first outlet, in which electrically charged droplets of the liquid can be ejected from the second outlet.

According to the aforementioned aspect, the liquid ejected from the first outlet of the first tube and the gas having flowed through the second channel collide with the reticulated member, or collide with each other at high speed in the region between the first outlet and the opening, whereby electrically charged droplets of the liquid are formed, atomized and ejected from the second outlet through the opening. Therefore, a spray ionization device, which is capable of efficiently obtaining atomized and electrically charged droplets to be ejected, can be provided.

PREFERRED MODE FOR CARRYING OUT THE INVENTION

Figure 1:
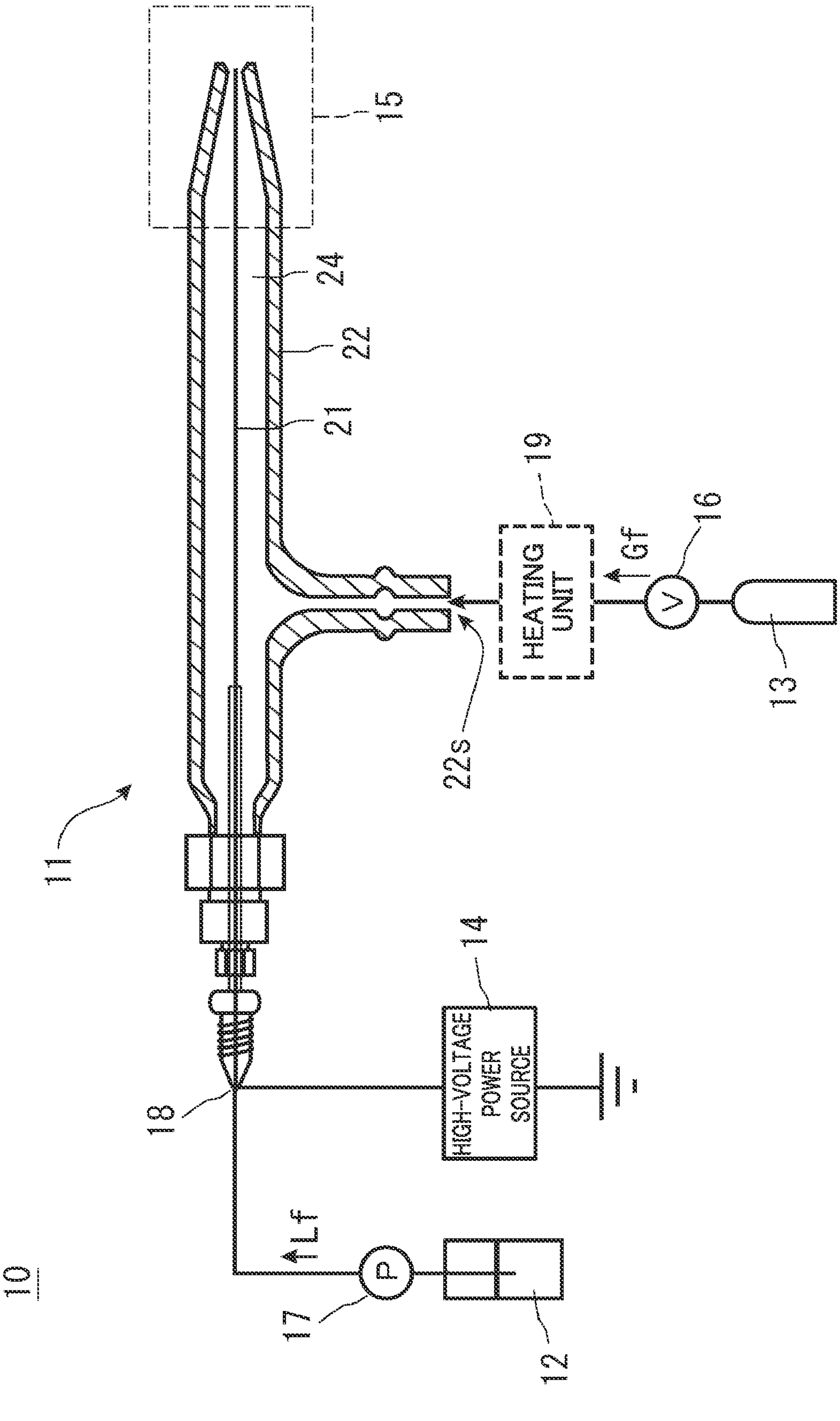
FIG. 1 is a diagram schematically illustrating a configuration of a spray ionization device according to a first embodiment of the present invention.

Hereinafter, embodiments of the present invention will be described with reference to the drawings. Note that elements that are common between a plurality of drawings are denoted by the same reference characters, and detailed description of such elements will not be repeated.

First Embodiment

Figure 2A:
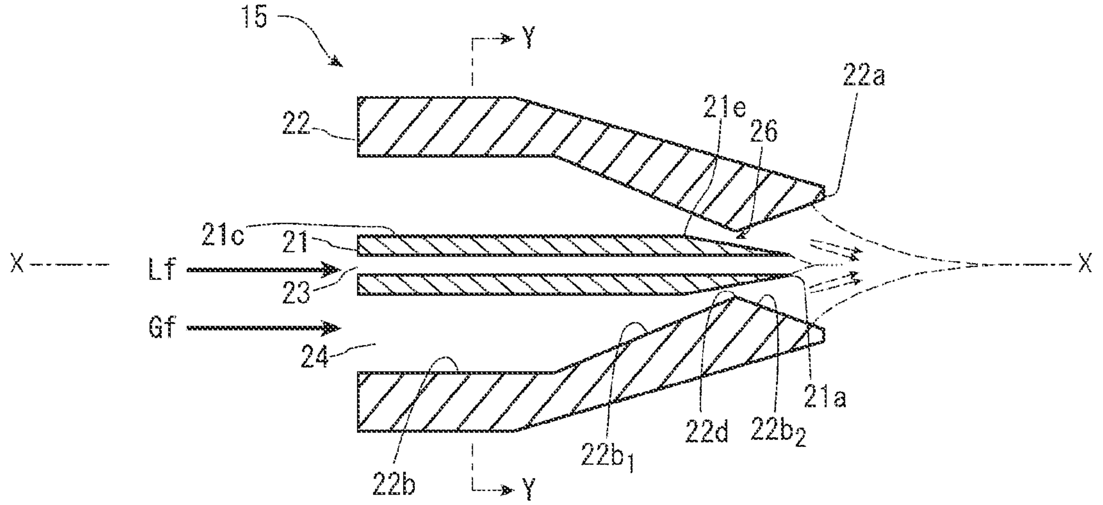
FIGS. 2A and 2B are cross-sectional views of a nozzle of a sprayer according to the first embodiment of the present invention.
Figure 2B:
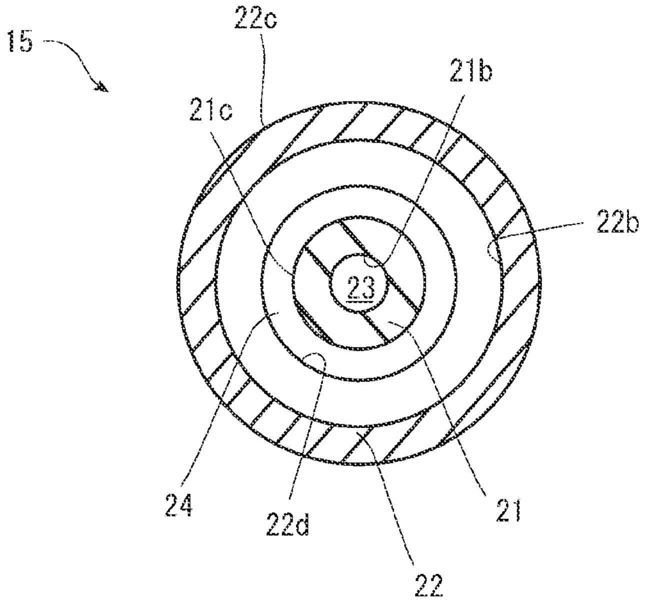
Figure 3A:
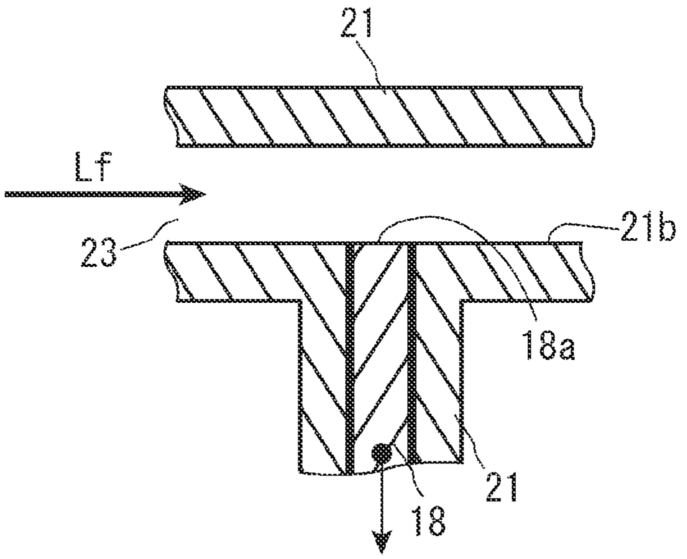
FIGS. 3A and 3B are cross-sectional views schematically illustrating a configuration of an electrode.
Figure 3B:
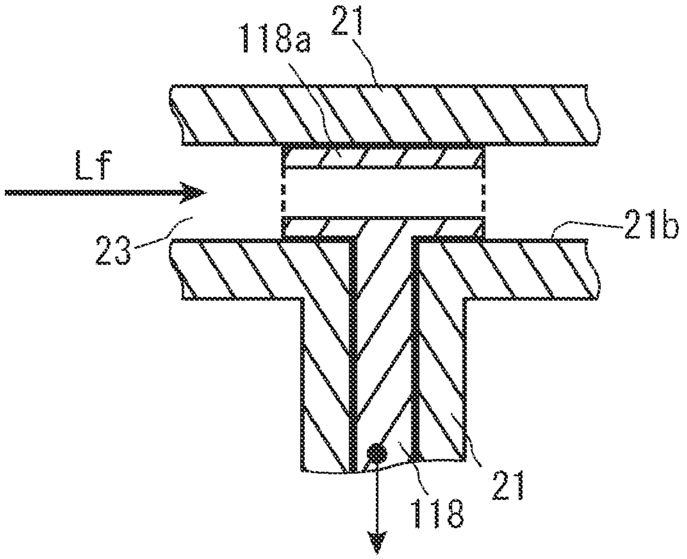

FIG. 1 is a diagram schematically illustrating a configuration of a spray ionization device according to a first embodiment of the present invention. FIGS. 2A and 2B are cross-sectional views of a nozzle of a sprayer, in which FIG. 2A is an enlarged cross-sectional view of the nozzle of FIG. 1, and FIG. 2B is a view along arrows Y-Y in FIG. 2A. FIGS. 3A and 3B are cross-sectional views schematically illustrating a configuration of an electrode.

Referring to FIGS. 1 to 3B, a spray ionization device 10 according to a first embodiment of the present invention includes: a sprayer 11; a container 12 containing a sample liquid Lf to be supplied to the sprayer 11; a cylinder 13 for containing a spraying gas Gf to be supplied to the sprayer 11; and a high-voltage power source 14 for applying high voltage to the sample liquid Lf via an electrode 18. A nozzle 15 for ejecting electrically charged droplets is formed at one end (hereinafter also referred to as an ejection end) of the sprayer 11 of the spray ionization device 10. The sample liquid Lf and the spraying gas Gf are supplied from further toward the opposite end than the nozzle 15 (hereinafter also referred to as a supply end). The sample liquid Lf may be continuously or intermittently supplied from the container 12 by way of a pump 17 or the like. The sample liquid Lf may contain an analysis target in solvents, or may contain dissolved components, particulate matter, or the like, for example. The spraying gas Gf is supplied from the cylinder 13 through the valve 16 to the supply port 22*s*. Inert gas such as nitrogen gas or argon gas, or air can be used for the spraying gas Gf, for example. A heating unit 19 such as a heater or dryer for heating the spraying gas Gf may be provided between the cylinder 13 or the valve 16 and the supply port 22*s*. The spraying gas Gf is heated, whereby vaporization of solvents in the ejected sample liquid Lf can be promoted, and electrically charged droplets can be obtained more efficiently.

The sprayer 11 includes a liquid supply tube 21 and a gas supply tube 22 that surrounds the liquid supply tube 21 with a gap. The liquid supply tube 21 and the gas supply tube 22 have a double tube structure, in which the tubes are preferably coaxial (central axis X-X) with one another.

The liquid supply tube 21 extends from the supply end to the ejection end. The liquid supply tube 21 includes a first channel 23 being tubular and defined by an inner circumferential surface 21*b* of the liquid supply tube 21, and includes an outlet 21*a* of the nozzle 15 at the ejection end. A diameter (inner diameter) of the inner circumferential surface 21*b* of the liquid supply tube 21 is preferably 10 μm to 250 μm, and a diameter (outer diameter) of an outer circumferential surface 21*c* of the liquid supply tube 21 is preferably 100 μm to 400 μm. In terms of atomizing droplets, an opening diameter of the outlet 21*a* is preferably 0.2 μm to 150 μm.

The liquid supply tube 21 may be made of a glass and plastic dielectric material. The electrode 18 is provided to the liquid supply tube 21 as described later; and as a variation, part of the liquid supply tube 21 may be made of an electrical conductor material to form the electrode 18, or the liquid supply tube 21 in its entirety may be made of an electrical conductor material, e.g., a metal tube such as stainless steel, to form the electrode 18.

The gas supply tube 22 includes a second channel 24 defined by an inner circumferential surface 22*b* of the gas supply tube 22 and the outer circumferential surface 21*c* of the liquid supply tube 21, and includes an outlet 22*a* of the nozzle 15. A diameter (inner diameter) of the inner circumferential surface 22*b* of the gas supply tube 22 is not limited in particular, and is, for example, 4 mm, further toward the supply end than the nozzle 15.

The gas supply tube 22 is made of a dielectric material such as glass or plastics, and is preferably made of silica glass, in particular, fused silica glass.

The spraying gas Gf is pressurized and supplied from the supply port 22*s* of the gas supply tube 22, flows through the second channel 24, and is ejected from the outlet 22*a*. A flow rate of the spraying gas Gf is appropriately set in accordance with the flow rate of the sample liquid Lf, and is set to 0.5 L/min to 5.0 L/min, for example.

The high-voltage power source 14 is a power source for generating high-voltage direct current voltage or high-frequency alternating-current voltage, and is connected to the electrode 18 arranged so as to be able to contact the sample liquid Lf flowing through the sprayer 11. The high-voltage power source 14 applies voltage of e.g., 4 kV to the electrode 18, and preferably applies voltage in a range of 0.5 kV to 10 kV in terms of ionization. In the case in which the high-voltage power source 14 generates high-frequency alternating-current voltage, the waveform is not limited in particular, and is a sine wave, a rectangular wave, or the like; and in the case of ionization utilizing a chemical reaction, the frequency is preferably 100 Hz to 1000 kHz.

As illustrated in FIG. 1, the electrode 18 is provided further toward the supply end than the outlet 21*a* of the liquid supply tube 21, for example, at the supply end of the liquid supply tube 21. As illustrated in FIG. 3A, the electrode 18 is formed so as to be able to contact the sample liquid Lf flowing through the first channel 23. The electrode 18 may be provided such that a distal end 18*a* of the electrode 18 forms a surface contiguous with the inner circumferential surface 21*b* of the liquid supply tube 21 or projects into the first channel 23. As long as the electrode 18 can contact the sample liquid Lf, the distal end 18*a* may be provided so as to recede from the inner circumferential surface 21*b* of the liquid supply tube 21. As a variation of the electrode 18 illustrated in FIG. 3B, an electrode 118 may include an annular member 118*a* in the first channel 23 such that the sample liquid Lf can flow through the inside of the annular member 118*a*. As a result, high voltage can be more easily applied to the sample liquid Lf. The electrode 18 or 118 is preferably made of a platinum-group element, gold, or alloy thereof, in terms of excellent corrosion resistance. The electrode 18 or 118 may be made of a metal material such as titanium or tungsten, which may be used for a common electrode. As described above, part or entirety of the liquid supply tube 21 may be made of an electrical conductor material to form the electrode 18. For example, the outlet 21*a* of the liquid supply tube 21 may be made of an electrical conductor material to form the electrode 18.

In the nozzle 15, the outlet 22*a* of the gas supply tube 22 is arranged further toward the distal end than the outlet 21*a* of the liquid supply tube 21. The gas supply tube 22 is formed such that a portion 22*b*$_1$ of the inner circumferential surface of the gas supply tube 22 has a diameter that progressively decreases from upstream toward downstream. As a result, the channel area of the second channel 24 progressively decreases. Here, the channel area refers to an area occupied by the second channel 24 on a plane perpendicular to the central axis X, in which the area is surrounded by the inner circumferential surface 22*b* of the gas supply tube 22 and the outer circumferential surface 21*c* of the liquid supply tube 21 as illustrated in FIG. 2B. The gas supply tube 22 is formed such that the diameter of the inner circumferential surface of the outlet 22*a* of the gas supply tube 22 is equal to or larger than the opening diameter of the outlet 21*a* of the surface liquid supply tube 21. With such a configuration, droplets of the sample liquid Lf are ejected from the outlet 21*a* of the liquid supply tube 21, enveloped in the spraying gas Gf flowing through the second channel 24, and flow in the X-axis direction while focusing along the X-axis in the central direction. As a result, droplets of the sample liquid Lf are suppressed from contacting the inner circumferential surface 22*b*2 of the gas supply tube 22 in the vicinity of the outlet 21*a* of the liquid supply tube 21, whereby the nozzle 15 can be prevented from clogging. The flow of the ejected sample liquid Lf focuses by the spraying gas Gf, whereby droplets are atomized. Since the electrode 18 applies high voltage supplied from the high-voltage power source 14 to the sample liquid Lf, the ejected and atomized droplets have been charged. In this manner, the spray ionization device 10 can eject atomized and electrically charged droplets.

The nozzle 15 of the sprayer 11 preferably includes a constriction portion 26 in the second channel 24, in which the channel area of the second channel 24 is the smallest. The constriction portion 26 is provided to a portion 22*d*, in which the inner circumferential surface 22*b* of the gas supply tube 22 has a diameter that progressively decreases from upstream toward downstream, and the distance between the inner circumferential surface 22*b* and the outer circumferential surface 21*c* of the liquid supply tube 21 is the smallest. The outer circumferential surface 21*c* of the liquid supply tube 21 has a diameter that progressively decreases from upstream toward the outlet 21*a* at a first rate per length in the X-axis direction; the inner circumferential surface 22*b* of the gas supply tube 22 has a diameter that progressively decreases at a second rate per length in the X-axis direction; and the second rate is set greater than the first rate, whereby the constriction portion 26 is formed at the portion 22*d*.

In the constriction portion 26, a distance between the portion 22*d* of the inner circumferential surface of the gas supply tube 22 and the outer circumferential surface 21*c* of the liquid supply tube 21 is preferably set to 5 μm to 20 μm. The constriction portion 26 is arranged upstream of the outlet 21*a* of the liquid supply tube 21

This arrangement increases the pressure of the spraying gas Gf flowing through the second channel 24 at the constriction portion 26, increases the flow rate (linear velocity) of the spraying gas Gf having passed through the constriction portion 26, and promoting the atomization of the sample liquid Lf ejected from the outlet 21*a* of the liquid supply tube 21. Droplets ejected from the outlet 21*a* of the liquid supply tube 21 can be further suppressed from flowing backward through the second channel 24 and entering the constriction portion 26. As a result, clogging of the constriction portion 26 due to precipitation of components such as salts contained in droplets can be suppressed, whereby stable ejection can be achieved. This arrangement achieves a flow-focusing effect, in which droplets ejected from the outlet 21*a* can be ejected at a narrower angle (i.e., in a smaller lateral spreading range with respect to the ejection direction) than the case without the constriction portion 26. As a result, efficiency of generating gas phase ions in the ejected and electrically charged droplets can be enhanced. The constriction portion 26 is preferably provided 50 μm to 2000 μm upstream from the outlet 21*a*.

The diameter of the inner circumferential surface 22*b*2 of the gas supply tube 22 in the vicinity of the outlet 22*a* may progressively increase from the portion 22*d* of the constriction portion 26 toward the outlet 22*a*. As a result, the channel area of the second channel 24 is progressively widened toward the outlet 22*a*. As a result, the flow of the spraying gas Gf can be suppressed from being disturbed, and the flow of the ejected, atomized and electrically charged droplets can be suppressed from spreading laterally with respect to the ejection direction.

The outer circumferential surface 21*c* of the liquid supply tube 21 may have a constant outer diameter toward the outlet 21*a*, or may have a diameter that progressively decreases as illustrated in FIG. 2A. A position 21*e*, at which the diameter of the outer circumferential surface 21*c* starts to decrease, is preferably formed upstream of the constriction portion 26. As a result, the flow of the spraying gas Gf can more easily focus onto the outlet 21*a* of the liquid supply tube 21, whereby the ejected droplets of the sample liquid Lf can be suppressed from splashing, allowing the droplets to be effectively formed.

The outlet 21*a* of the liquid supply tube 21 preferably has an opening diameter smaller than the diameter of the inner circumferential surface 22*b* of the gas supply tube 22 at the constriction portion 26. As a result, the spraying gas Gf having passed through the constriction portion 26 can form a flow so as to envelop the flow of droplets of the sample liquid Lf, in the outlet 21*a* of the liquid supply tube 21.

Figure 4A:
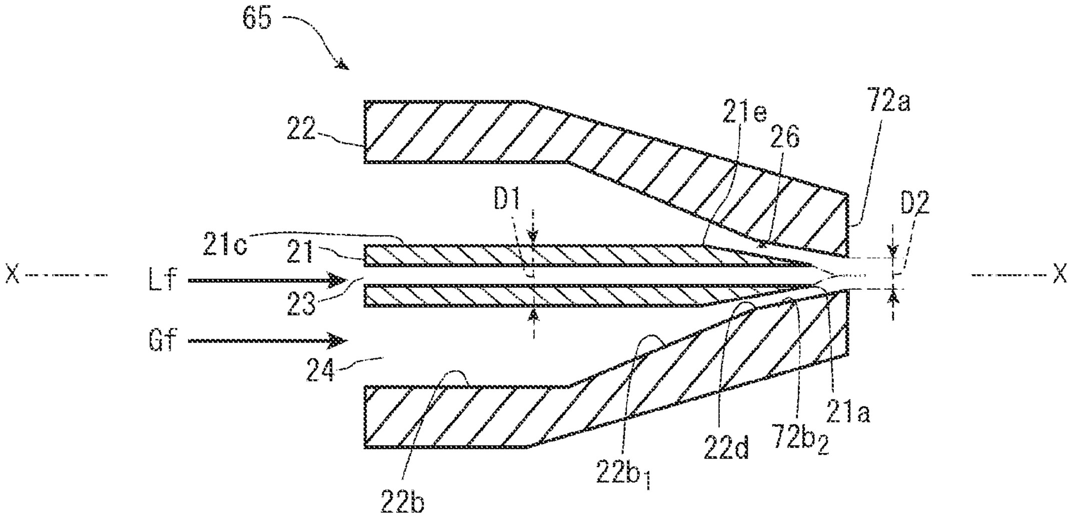
FIGS. 4A and 4B are cross-sectional views illustrating an alternative example of a gas supply tube of the nozzle of the sprayer of the first embodiment of the present invention.
Figure 4B:
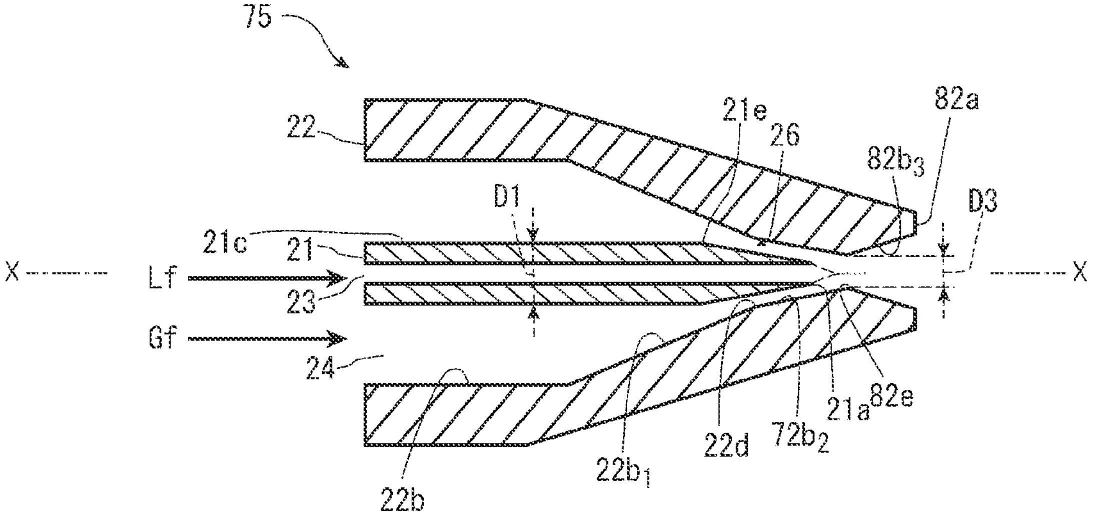

A variation of the gas supply tube 22 will be described below. FIGS. 4A and 4B are cross-sectional views illustrating alternative examples of the gas supply tube of the nozzle of the sprayer. Referring to FIG. 4A, the gas supply tube 22 is preferably formed in the nozzle 65 such that at least a portion 72*b*$_2$ of the inner circumferential surface of the gas supply tube 22 has a diameter that progressively decreases from the portion 22*d* of the constriction portion 26 toward the outlet 72*a*, and the opening diameter (D2) of the outlet 72*a* of the gas supply tube 22 is equal to or smaller than the diameter D1 (further toward the supply end than the portion 21*e*) of the outer circumferential surface 21*c* of the liquid supply tube, at the tip of the outlet 21*a* of the liquid supply tube 21. Specifically, the formation satisfies a relationship of D1≥D2. As a result, the flow-focus effect is further enhanced, in which the ejected, atomized and electrically charged droplets can flow at a narrower angle than the case of the nozzle 15 illustrated in FIGS. 2A and 2B.

As another alternative example, referring to FIG. 4B, the gas supply tube 22 is formed in the nozzle 75 such that: a portion 72*b*2 of the inner circumferential surface of the gas supply tube 22 has a diameter that progressively decreases downstream from the portion 22*d* of the constriction portion 26; the diameter of the inner circumferential surface of the gas supply tube 22 is the smallest at a portion 82*e*, further toward the tip than the outlet 21*a* of the liquid supply tube; and the inner circumferential surface 82*b*$_3$ has a diameter that progressively increases toward the outlet 82*a*, further toward the tip than the outlet 21*a* of the liquid supply tube. An opening diameter D3 of a portion 82*e*, at which the diameter of the inner circumferential surface of the gas supply tube 22 is the smallest, is formed to be equal to or smaller than the diameter D1 (further toward the supply end than the portion 21*e*) of the outer circumferential surface 21*c* of the liquid supply tube. Specifically, the formation satisfies a relationship of D1≥D3. As a result, the same flow-focus effect as that of the nozzle 65 of FIG. 4A can be achieved, and the content of the sample liquid Lf becomes more unlikely to adhere to the inner circumferential surface 82*b*$_3$ having a diameter that progressively increases, and clogging becomes more unlikely to occur even in a case of continuous operation for long hours.

Hereinafter, a variation of the sprayer according to the first embodiment of the present invention will be described. In the variation, configurations different from those of the nozzle 15 illustrated in FIGS. 2A and 2B will be described, and the same reference numerals as those in FIGS. 2A and 2B will be assigned to the same configurations, and descriptions thereof will be omitted. The same configurations omitting description achieve the same effects in the variation, in which description of the effects is omitted for the sake of simplicity.

Figure 5A:
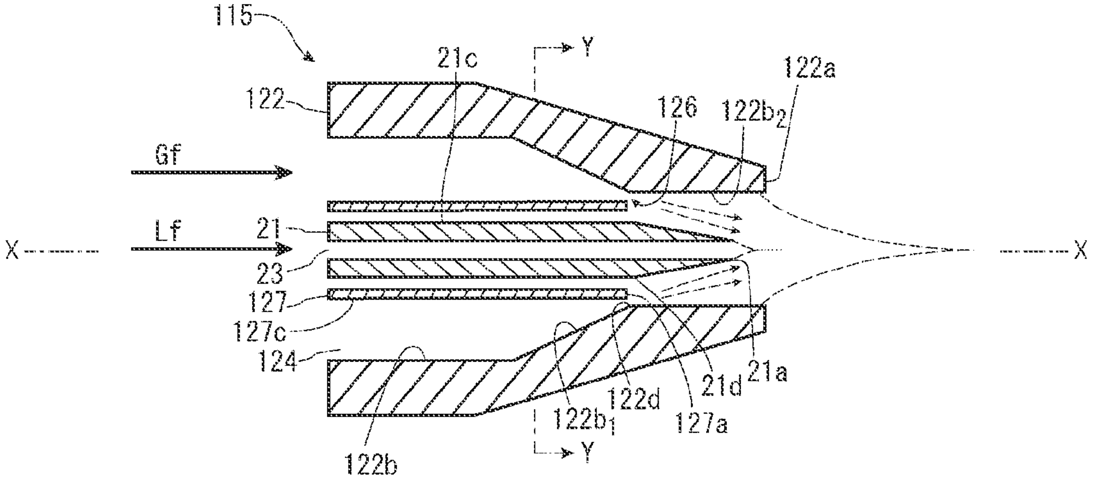
FIGS. 5A and 5B are cross-sectional views of the nozzle of a first variation of the sprayer of the first embodiment of the present invention.
Figure 5B:
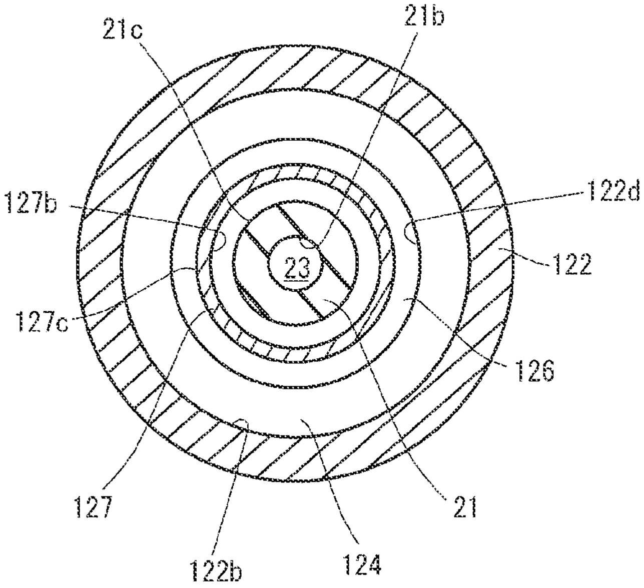

FIG. 5A and FIG. 5B are cross-sectional views of the nozzle of the first variation of the sprayer according to the first embodiment of the present invention, in which FIG. 5A is an enlarged cross-sectional view, and FIG. 5B is a view along arrows Y-Y in FIG. 5A.

Referring to FIGS. 5A and 5B together with FIG. 1, the sprayer of the first variation of the first embodiment includes: the liquid supply tube 21; a gas supply tube 122; a protective tube 127 surrounding the liquid supply tube 21 and provided between the liquid supply tube 21 and the gas supply tube 122; and an electrode 18 for applying high voltage to the sample liquid Lf flowing through the liquid supply tube 21. The electrode 18 has the same configuration as illustrated in FIGS. 1, 3A and 3B. The sprayer has a triple tube structure, in which the tubes are preferably coaxial (central axis X-X) with one another.

The liquid supply tube 21 has the same configuration as the liquid supply tube 21 illustrated in FIGS. 1, 2A and 2B. A second channel 124 of the gas supply tube 122 is a space defined by the outer circumferential surface 127*c* of the protective tube 127 and the inner circumferential surface 122*b* of the gas supply tube 122, in which the spraying gas Gf flows through the second channel 124. Note that the spraying gas Gf is not supplied to a space defined by the outer circumferential surface 21*c* of the liquid supply tube 21 and the inner circumferential surface of the protective tube 127.

In the nozzle 115, the inner circumferential surface 122*b* of the gas supply tube 122 has the same shape as the inner circumferential surface 22*b* of the gas supply tube 22 illustrated in FIGS. 2A and 2B. As a result, the spray ionization device including the sprayer of the first variation can eject the atomized and electrically charged droplets.

The tip 127*a* at the ejection end of the protective tube 127 is located further to the supply end than the outlet 21*a* of the liquid supply tube 21. In the nozzle 115, a constriction portion 126 of the second channel 124 is preferably formed by the outer circumferential surface 127*c* of the tip 127*a* of the protective tube 127 and the portion 122*b*$_1$ of the inner circumferential surface of the gas supply tube 122. As a result, the second channel 124 is formed such that the channel area of the second channel 124 progressively decreases from the supply end to the constriction portion 126. The spraying gas Gf passes through the constriction portion 126 to gain the flow velocity, and the flow of electrically charged droplets of the sample liquid Lf ejected from the outlet 21*a* of the liquid supply tube 21 further focuses, promoting atomization of droplets.

The gas supply tube 122 is formed such that the inner circumferential surface 122*b*$_2$ has a constant diameter (inner diameter) from the constriction portion 126 toward the outlet 122*a*. As a result, the flow of the spraying gas Gf ejected from the constriction portion 126 is not blocked by any members, whereby turbulence can be suppressed from being generated. The gas supply tube 122 may be formed such that the inner circumferential surface 122*b*$_2$ of the gas supply tube 122 has a diameter that progressively increases from the constriction portion 126 toward the outlet 122*a*. As a result, the same effects as in the case of the constant diameter can be achieved.

Figure 6A:
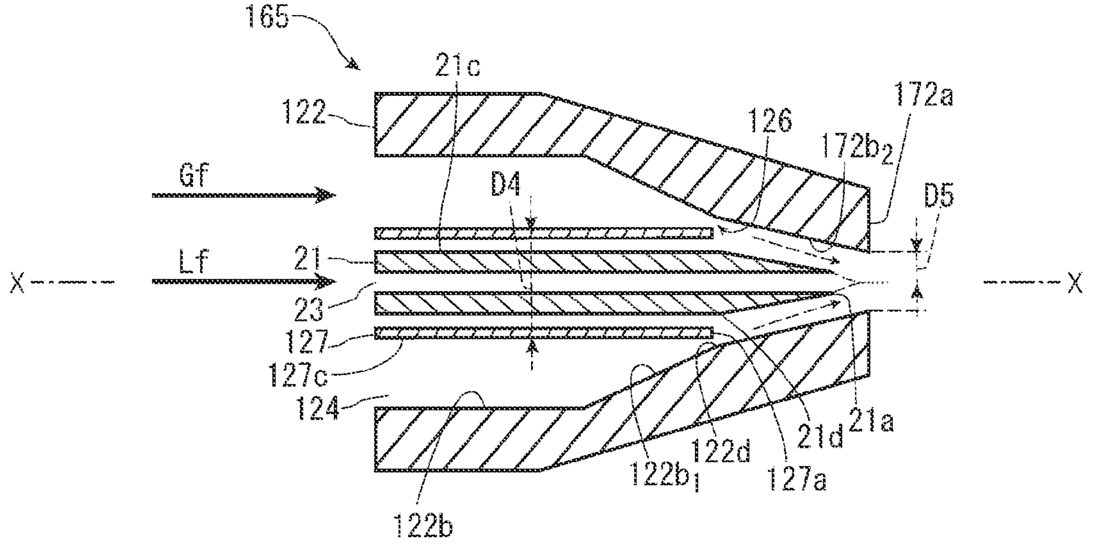
FIGS. 6A and 6B are cross-sectional views of an alternative example of the gas supply tube of the nozzle of the first variation.
Figure 6B:
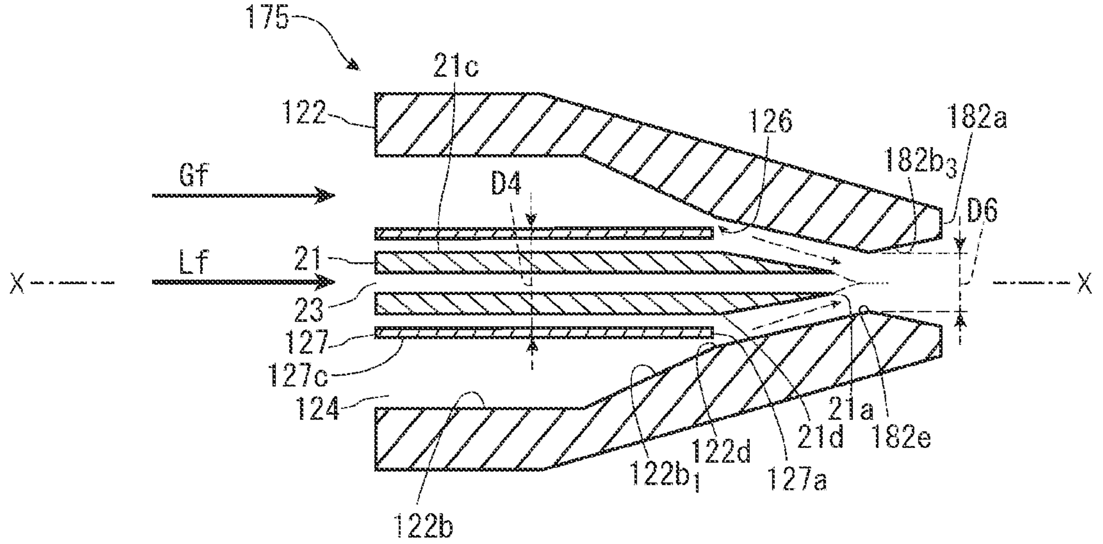

The gas supply tube 122 may be configured as illustrated in FIGS. 4A and 4B. FIGS. 6A and 6B are cross-sectional views of an alternative example of the gas supply tube of the nozzle of the first variation. Referring to FIG. 6A, the gas supply tube 122 is formed in the nozzle 165 such that: at least a portion 172*b*$_2$ of the inner circumferential surface of the gas supply tube 122 has a diameter that progressively decreases from the portion 122*d* of the constriction portion 126 toward an outlet 172*a*; and an opening diameter (D5) of the outlet of the gas supply tube is formed to be equal to or smaller than the diameter D4 of the outer circumferential surface 127*c* of the protective tube 127, further toward the tip than the outlet 21*a* of the liquid supply tube 21. Specifically, the formation satisfies a relationship of D4≥D5. As a result, the flow-focus effect can be further enhanced, and the ejected, atomized and electrically charged droplets can form a flow at a narrower angle.

As another alternative example, referring to FIG. 6B, the gas supply tube 122 is formed in the nozzle 175 such that: the portion 172*b*$_2$ of the inner circumferential surface of the gas supply tube 122 has a diameter that progressively decreases downward from the portion 122*d* of the constriction portion 126; the diameter of the inner circumferential surface of the gas supply tube 122 is the smallest at a portion 182*e*, further toward the tip than the outlet 21*a* of the liquid supply tube; and the inner circumferential surface 182*b*$_3$ has a diameter that progressively increases toward the outlet 182*a*. The opening diameter D6 of the portion 182*e*, at which the diameter of the inner circumferential surface of the gas supply tube 122 is the smallest, is formed to be equal to or smaller than the diameter D4 of the outer circumferential surface 127*c* of the protective tube 127. Specifically, the formation satisfies a relationship D4≥D6. As a result, the same flow-focus effect as that of the nozzle 165 of FIG. 6A can be achieved, and the content of the sample liquid Lf becomes more unlikely to adhere to the inner circumferential surface 182*b*$_3$, and clogging becomes more unlikely to occur even if an operation is continued for a long time.

In terms of ejecting droplets of the sample liquid Lf in a smaller lateral spreading range with respect to the ejection direction using the flow-focus effect of the flow of the spraying gas Gf, the opening diameter (diameter) of the outlet 21*a* of the liquid supply tube 21 is preferably smaller than the diameter of the outer circumferential surface 127*c* of the tip 127*a* of the protective tube 127 in the constriction portion 126.

Note that the nozzle 115 may include, instead of the constriction portion 126, a constriction portion similar to the constriction portion 26 formed by the outer circumferential surface 21*c* of the liquid supply tube 21 and the portion 22*d* of the inner circumferential surface of the gas supply tube 22, which is illustrated in FIGS. 2A and 2B. In this case, the constriction portion may be formed by the outer circumferential surface 21*c* of the liquid supply tube 21 and any one of the portion 122*b*$_1$ in which the inner circumferential surface 122*b* of the gas supply tube 122 has a diameter that progressively decreases toward the outlet 122*a*, the portion 122*d* having the smallest inner diameter, or the portion 122*b*$_2$ having the constant inner diameter.

Figure 7:
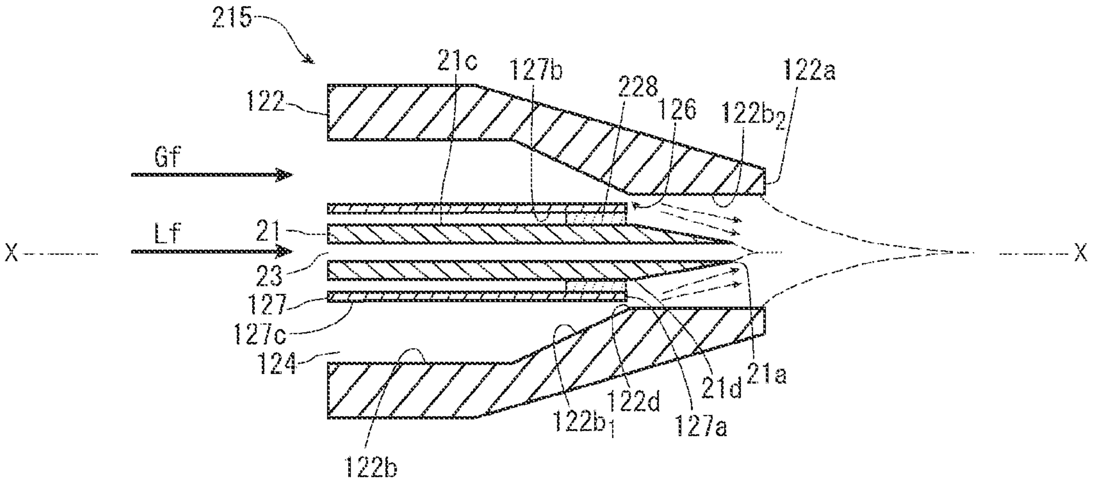
FIG. 7 is a cross-sectional view of a nozzle of a second variation of the sprayer of the first embodiment of the present invention.

FIG. 7 is an enlarged cross-sectional view of the nozzle of a second variation of the sprayer of the first embodiment of the present invention. Referring to FIG. 7, the nozzle 215 of the second variation includes a blocking member 228 in a gap between the outer circumferential surface 21*c* of the liquid supply tube 21 and the inner circumferential surface 127*b* of the protective tube 127, at the tip 127*a* toward the ejection end of the protective tube 127, in which the gap is blocked by the blocking member 228. Except that the closing member 228 is provided, the nozzle 215 has the same configuration as the nozzle 215 of the sprayer of the first variation illustrated in FIGS. 5A and 5B. With this configuration, the blocking member 228 prevents the spraying gas Gf having passed through the constriction portion 126 from entering the gap between the outer circumferential surface 21*c* of the liquid supply tube 21 and the inner circumferential surface 127*b* of the protective tube 127. As a result, turbulence of the spraying gas Gf is suppressed from occurring, the flow of electrically charged droplets of the sample liquid Lf focuses, and atomization of droplets is promoted. The blocking member 228 may be provided entirely along the axial direction of the gap between the outer circumferential surface 21*c* of the liquid supply tube 21 and the inner circumferential surface 127*b* of the protective tube 127.

SECOND EMBODIMENT

A spray ionization device according to a second embodiment of the present invention has substantially the same configuration as the spray ionization device according to the first embodiment illustrated in FIG. 1, and description of the same elements are omitted.

Figure 8A:
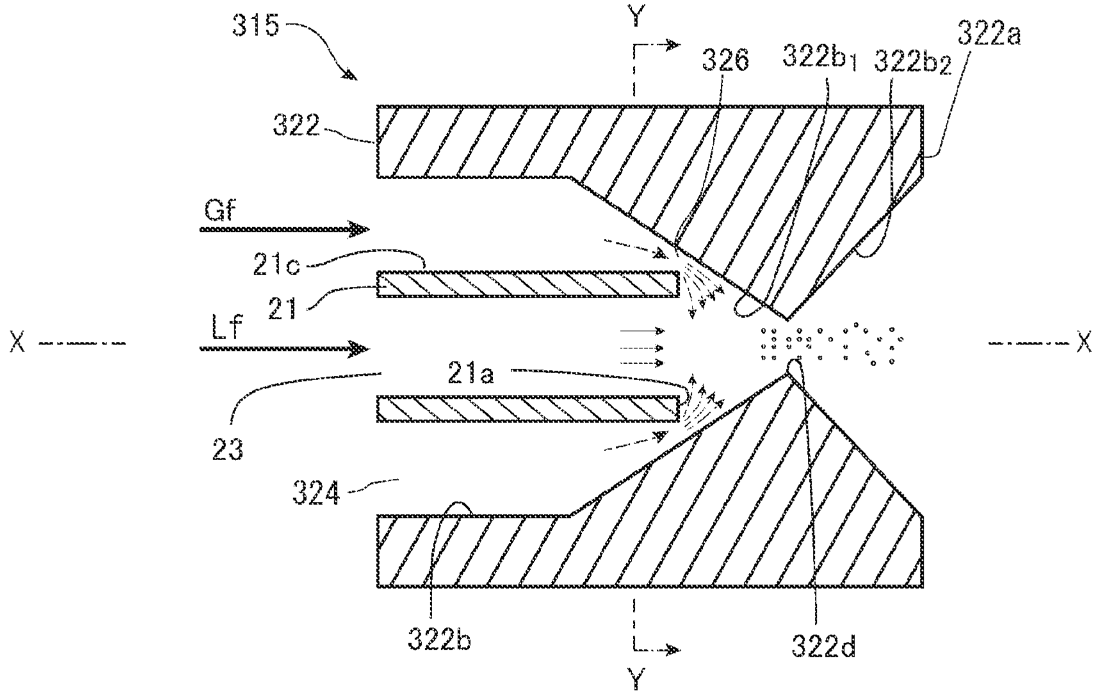
FIGS. 8A and 8B are cross-sectional views of a nozzle of a sprayer of a spray ionization device according to a second embodiment of the present invention.
Figure 8B:
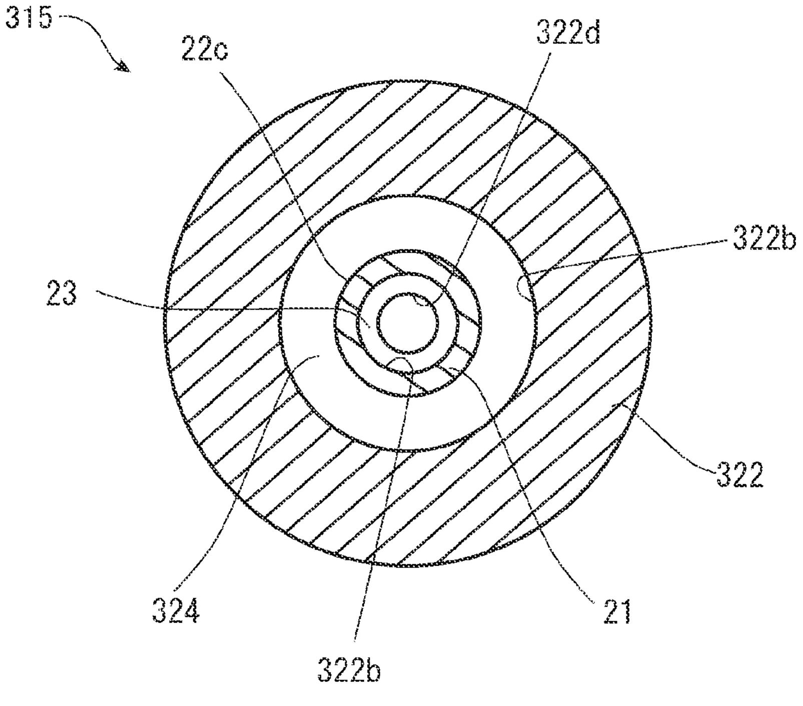

FIGS. 8A and 8B are cross-sectional views of a nozzle of the spray ionization device according to the second embodiment of the present invention, in which FIG. 8A is an enlarged cross-sectional view of the nozzle, and FIG. 8B is a view along arrows Y-Y in FIG. 8A illustrating the nozzle.

Referring to FIGS. 8A and 8B together with FIG. 1, the sprayer of the spray ionization device according to the second embodiment of the present invention includes: a liquid supply tube 21; a gas supply tube 322; and an electrode 18 for applying high voltage to a sample liquid Lf flowing through the liquid supply tube 21. The electrode 18 has the same configuration as illustrated in FIGS. 1, 3A and 3B. The sprayer has a double tube structure, in which the tubes are preferably coaxial (central axis X-X) with one another. The liquid supply tube 21 has substantially the same configuration as the liquid supply tube 21 of the first embodiment illustrated in FIGS. 1, 2A and 2B. The liquid supply tube 21 includes a first channel 23 defined by the inner circumferential surface of the liquid supply tube 21 and extending in the axial direction. The sample liquid Lf flows through the liquid supply tube 21 and is ejected from an outlet 21*a*. The gas supply tube 322 has substantially the same configuration as the gas supply tube 22 illustrated in FIGS. 1, 2A and 2B. The gas supply tube 322 includes a second channel 324 defined by the inner circumferential surface 322*b* of the gas supply tube 322 and the outer circumferential surface 21*c* of the liquid supply tube 21 and extending in the axial direction. The spraying gas Gfs flows through the second channel 324.

In the nozzle 315, the outlet 21*a* of the liquid supply tube 21 is located further toward the supply end than the outlet 322*a* of the gas supply tube 322. The gas supply tube 322 includes an ejection port 322*d* between the outlet 322*a* of the gas supply tube 322 and the outlet 21*a* of the liquid supply tube 21. The ejection port 322*d* is a portion in which the diameter of the inner circumferential surface of the gas supply tube 322 is the smallest, and the ejection port 322*d* is formed narrower than the opening of the outlet 21*a* of the liquid supply tube 21. For example, the opening diameter of the ejection port 322*d* is smaller than the opening diameter of the outlet 21*a* of the liquid supply tube 21. With this configuration, the sample liquid Lf ejected from the outlet 21*a* of the liquid supply tube 21 collides with the spraying gas Gf having flowed through the second channel 324, at high speed in the region between the outlet 21*a* and the ejection port 322*d*, whereby the electrically charged droplets of the sample liquid Lf are atomized and ejected from the outlet 322*a* through the ejection port 322*d*.

In the nozzle 315, the second channel 324 preferably includes a constriction portion 326 in which the channel area of the second channel 324 is the smallest. The constriction portion 326 is formed by a gap between a portion 322$b_1$, in which the inner circumferential surface 322$b$ of the gas supply tube 322 has a diameter that progressively decreases from upstream to downstream, and the outer circumferential surface 21$c$ of the outlet 21$a$ of the liquid supply tube 21. The spraying gas Gf gains linear velocity in the constriction portion 326 and collides with the sample liquid Lf at high speed in the region between the outlet 21$a$ of the liquid supply tube 21 and the ejection port 322$d$, whereby atomization of electrically charged droplets of the sample liquid Lf is promoted. The spraying gas Gf is ejected from the constriction portion 326 at high speed; therefore, the content of the sample liquid Lf is unlikely to adhere to the vicinity of the ejection port 322$d$, and clogging is unlikely to occur. The liquid supply tube 21 is supported in a cantilever manner at the supply end, whereby when the spraying gas Gf is ejected from the constriction portion 326 at high speed, the outlet 21$a$ of the liquid supply tube 21 easily vibrates in a direction perpendicular to the ejection direction. Then, the gap at the constriction portion 326 temporally changes, so that the flow rate of the spraying gas Gf having passed through the constriction portion 326 changes, and the spraying gas flows locally at higher speed. As a result, the content of the sample liquid Lf is further unlikely to adhere to the vicinity of the ejection port 322$d$, and clogging is further unlikely to occur.

Hereinafter, a variation of the sprayer according to the second embodiment of the present invention will be described. In the variation, configurations different from the nozzle 315 illustrated in FIGS. 8A and 8B will be described, the same reference numerals as in FIGS. 8A and 8B or FIGS. 2A and 2B will be assigned to the same configurations, and description thereof will be omitted. The same configurations omitting description achieve the same effects in the variation, in which description of the effects is omitted for the sake of simplicity.

Figure 9A:
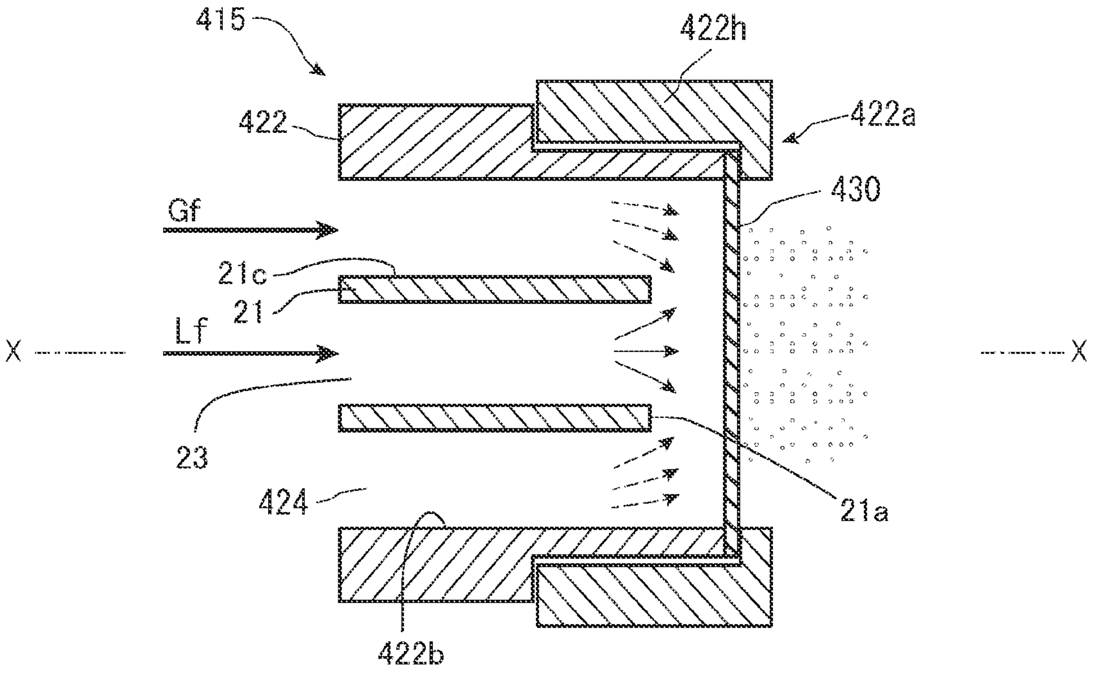
FIGS. 9A and 9B are views illustrating a nozzle of the first variation of the sprayer according to the second embodiment of the present invention.
Figure 9B:
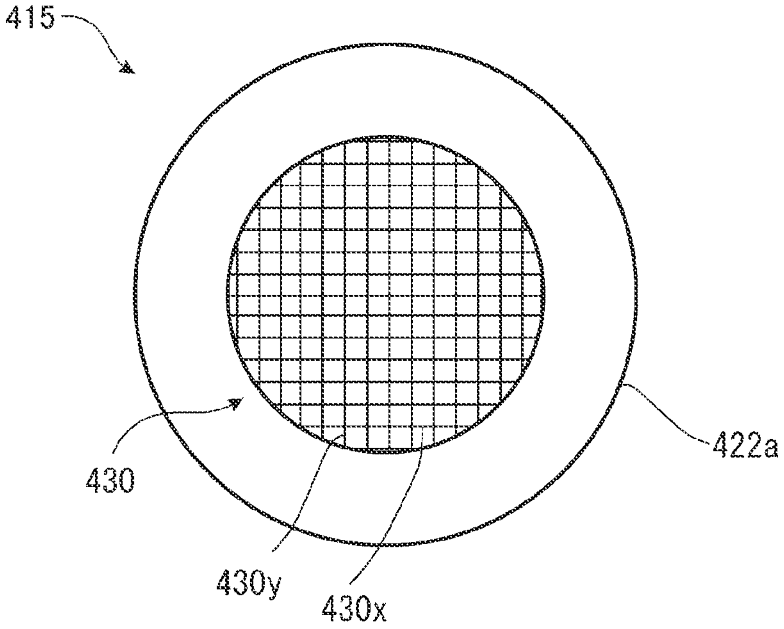

FIGS. 9A and 9B are views illustrating a nozzle of a first variation of the sprayer according to the second embodiment of the present invention, in which FIG. 9A is an enlarged cross-sectional view, and FIG. 9B is a view of the nozzle from the ejection end.

Referring to FIGS. 9A and 9B together with FIG. 1, the sprayer of the first variation of the second embodiment includes a liquid supply tube 21, a gas supply tube 422, and an electrode 18 for applying high voltage to the sample liquid Lf flowing through the liquid supply tube 21. The electrode 18 has the same configuration as illustrated in FIGS. 1, 3A and 3B. The sprayer has a double tube structure, in which the tubes are preferably coaxial (central axis X-X) with one another.

The liquid supply tube 21 has the same configuration as the liquid supply tube 21 of the second embodiment illustrated in FIGS. 8A and 8B, and the sample liquid Lf is ejected from the outlet 21$a$.

The gas supply tube 422 includes a second channel 424 defined by the inner circumferential surface 422$b$ of the gas supply tube 422 and the outer circumferential surface 21$c$ of the liquid supply tube 21 and extending in the axial direction. The spraying gas Gf flows through the second channel 424 and is ejected from the outlet 422$a$.

A reticulated member 430 is provided to the outlet 422$a$ of the gas supply tube 422. The reticulated member 430 is retained by a retaining member 422$h$ and arranged so as to cover the opening of the outlet 422$a$ of the gas supply tube 422. For example, a sheet-like mesh sheet can be used for the reticulated member 430. A dielectric material can be used for the mesh sheet, and for example, nylon fiber can be used.

The reticulated member 430 has horizontal lines 430$x$ and vertical lines 430$y$ with an interval of 70 μm, for example, in which a vertical and horizontal size of each aperture is 35 μm, for example. The distance between the outlet 21$a$ of the liquid supply tube 21 and the reticulated member 430 is set to 100 μm, for example, and is preferably set to 5 μm to 300 μm.

With this configuration, electrically charged droplets of the sample liquid Lf ejected from the outlet 21$a$ of the liquid supply tube 21 together with the spraying gas Gf having flowed through the second channel 424 collides with the reticulated member 430 at high speed, whereby the electrically charged droplets of the sample liquid Lf are atomized in the region between the outlet 21$a$ and the reticulated member 430, and ejected through the opening of the reticulated member 430 by way of the spraying gas Gf.

Figure 10:
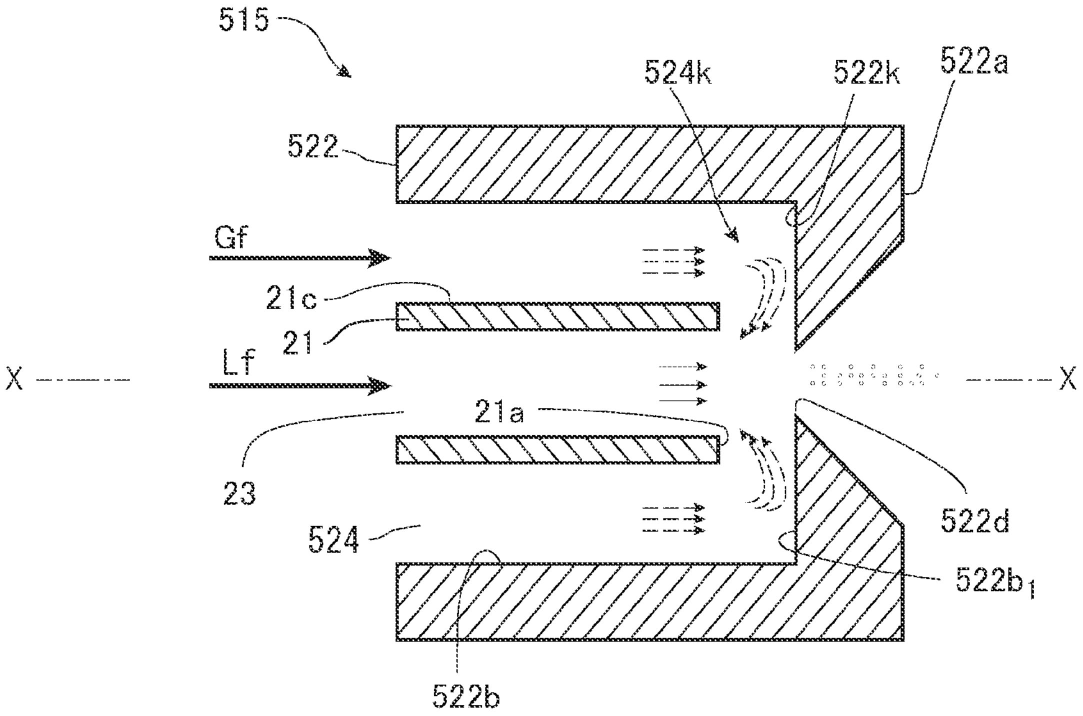
FIG. 10 is a cross-sectional view of the second variation of the nozzle of the sprayer of the second embodiment of the present invention.

FIG. 10 is an enlarged cross-sectional view of a nozzle of a second variation of the sprayer of the second embodiment of the present invention. Referring to FIG. 10 together with FIG. 1, the second variation of the sprayer of the second embodiment includes a liquid supply tube 21, a gas supply tube 522, and an electrode 18 for applying high voltage to the sample liquid Lf flowing through the liquid supply tube 21. The electrode 18 has the same configuration as illustrated in FIGS. 1, 3A and 3B. The sprayer has a double tube structure, in which the tubes are preferably coaxial (central axis X-X) with one another.

The liquid supply tube 21 has the same configuration as the liquid supply tube 21 of the second embodiment illustrated in FIGS. 8A and 8B, and the sample liquid Lf is ejected from the outlet 21$a$. The gas supply tube 522 includes a second channel 524 defined by the inner circumferential surface 522$b$ of the gas supply tube 522 and the outer circumferential surface 21$c$ of the liquid supply tube 21 and extending in the axial direction. The spraying gas Gf flows through the second channel 524 and is ejected from the outlet 522$a$.

In the nozzle 515, the inner circumferential surface 522$b$ of the gas supply tube 522 has a diameter that decreases at a portion 522$k$ further toward the tip than the outlet 21$a$ of the liquid supply tube 21, and the inner circumferential surface 522$b_1$ is bent perpendicularly to the X-axis direction. A bent portion 524$k$ bent toward the outlet 21$a$ of the liquid supply tube 21 is formed in the second channel 524. As a result, the spraying gas Gf flows toward the outlet 21$a$ of the liquid supply tube 21 at the bent portion 524$k$, and collides with the sample liquid Lf at high speed in the region between the outlet 21$a$ and an ejection port 522$d$, whereby the electrically charged droplets of the sample liquid Lf are atomized.

The inner circumferential surface 522$b_1$ of the gas supply tube 522 is bent perpendicularly to the X-axis direction, or may be bent at an angle that is larger or smaller than the vertical angle, depending on the flow velocity or the like of the spraying gas Gf. The spraying gas Gf enters the inside of the liquid supply tube 21 from the outlet 21$a$ and collides with the electrically charged droplets of the sample liquid Lf, whereby atomization of the electrically charged droplets of the sample liquid Lf is promoted.

The ejection port 522$d$ may be provided with the reticulated member 430 of the sprayer of the first variation illustrated in FIGS. 9A and 9B. As a result, atomization of electrically charged droplets of the sample liquid Lf is further promoted.

As a further variation of the sprayer of the spray ionization device according to the second embodiment of the present invention, a second gas supply tube may be provided so as to surround the gas supply tube with a gap.

Figure 11:
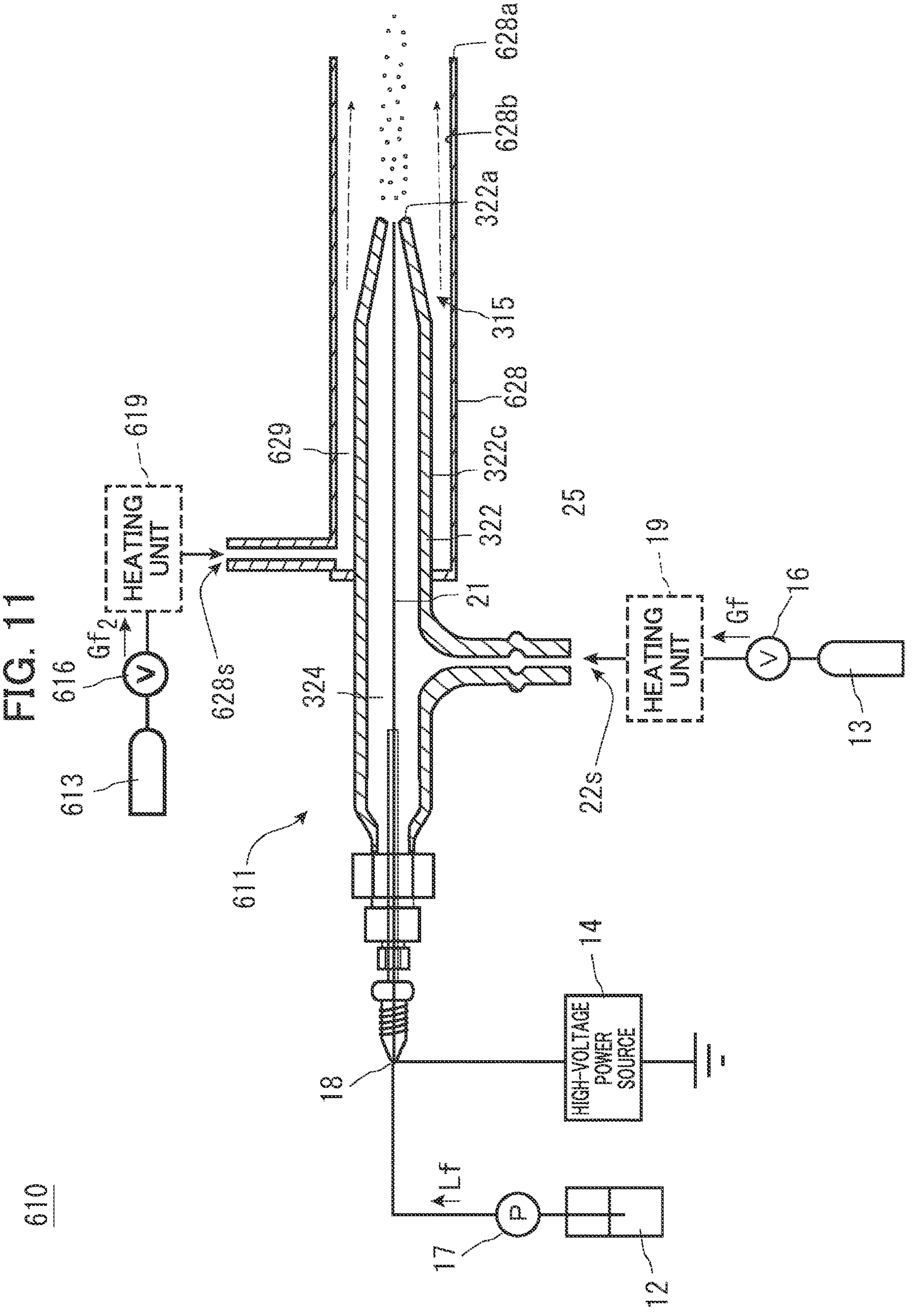
FIG. 11 is a diagram schematically illustrating a configuration of another variation of the spray ionization device according to the second embodiment of the present invention.

FIG. 11 is a diagram schematically illustrating a configuration of another variation of the spray ionization device according to the second embodiment of the present invention. Referring to FIG. 11, a spray ionization device 610 includes a second gas supply tube 628 in which a sprayer 611 surrounds a gas supply tube 322, and the nozzle 315 is the nozzle 315 illustrated in FIGS. 8A and 8B. A cylinder 613 supplies sheath gas $Gf_2$ via a valve 616 to a supply port 628*s* of the second gas supply tube 628.

The second gas supply tube 628 includes a third channel 629 defined by an outer circumferential surface 322*c* of the gas supply tube 322 and an inner circumferential surface 628*b* of the second gas supply tube 628 and extending in the axial direction. The inner circumferential surface 628*b* of the second gas supply tube 628 is formed so as to have a constant diameter toward an outlet 628*a*. The flow of sheath gas $Gf_2$ flowing through the third channel 629 is restricted from spreading by the inner circumferential surface 628*b* of the second gas supply tube 628 toward the outlet 628*a*, and the atomized and electrically charged droplets ejected from the nozzle 315 are enveloped in the sheath gas $Gf_2$. As a result, the outlet 628*a* of the second gas supply tube 628 ejects the focused, atomized and electrically charged droplets along the axis in the ejection direction. With this configuration, even if the nozzle 315 cannot eject atomized droplets with sufficient focusing thereof, the sprayer 611 can eject focused and atomized droplets.

A heating unit 619 may be provided downstream of the valve 616 so as to supply the sheath gas $Gf_2$ as heated gas; or a heating unit such as a ring heater (not illustrated) may be provided downstream of the outlet 322*a* of the gas supply tube 322 so as to surround a second gas supply tube 622. As a result, desolvation of droplets can be supported.

The sprayer 611 can employ the nozzle 415 illustrated in FIGS. 9A and 9B or the nozzle 515 illustrated in FIG. 10, which achieve the same effects as the nozzle 315.

The sprayer 611 may employ the nozzle 15 illustrated in FIGS. 2A and 2B, the nozzle 65 or 75 illustrated in FIGS. 4A and 4B, the nozzle 115 illustrated in FIGS. 5A and 5B, the nozzle 165 or 175 illustrated in FIGS. 6A and 6B, or the nozzle 215 illustrated FIG. 7 of the first embodiment.

Figure 12:
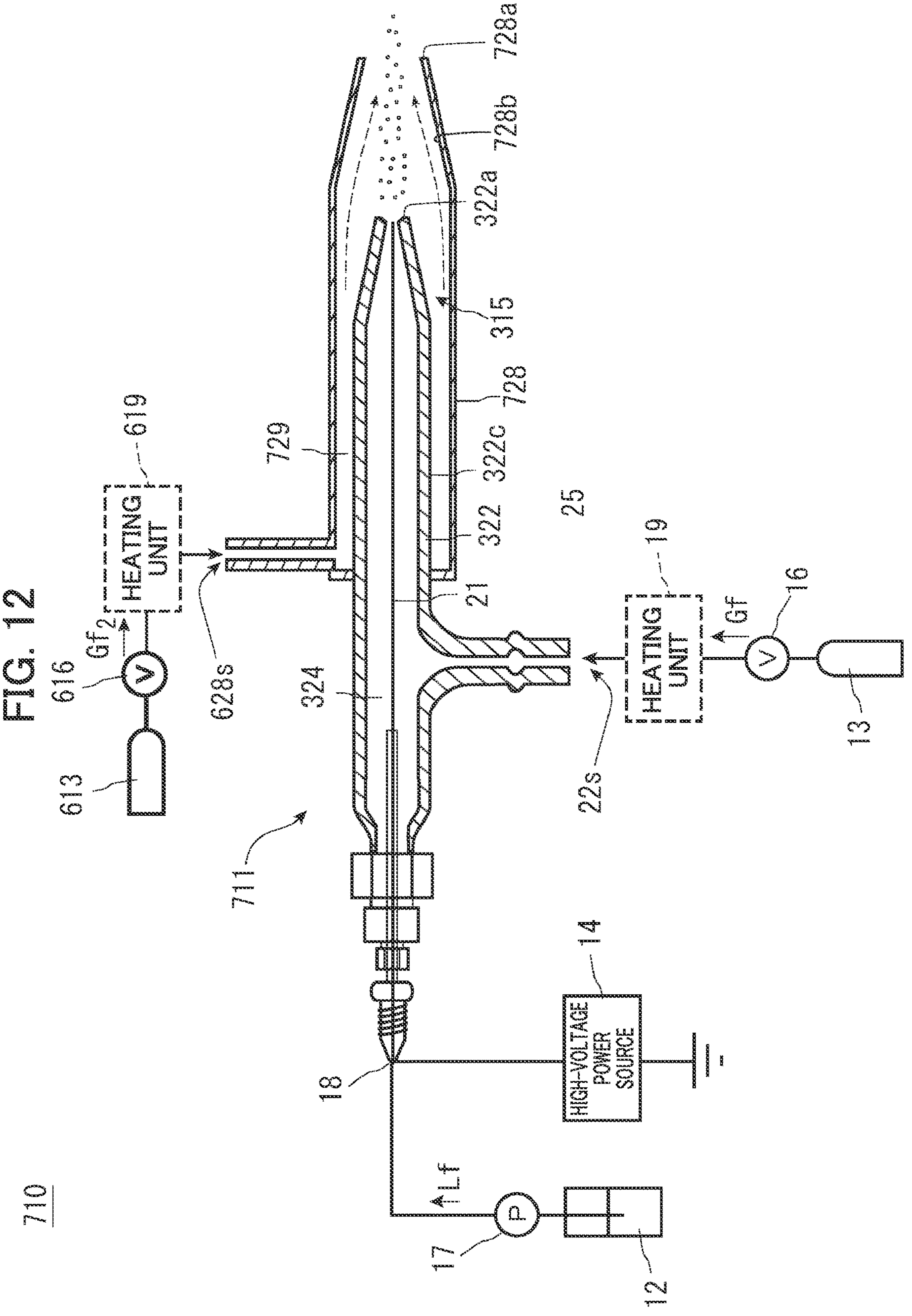
FIG. 12 is a diagram schematically illustrating a configuration of an alternative example of a second gas supply tube of still another variation of the spray ionization device according to the second embodiment of the present invention.

Alternative example of the second gas supply tube 628 will be described. FIG. 12 is a diagram schematically illustrating a configuration of the alternative example of the second gas supply tube of another variation of the spray ionization device. Referring to FIG. 12, a second gas supply tube 728 of a sprayer 711 of a spray ionization device 710 has the same configuration as the second gas supply tube 628, except that the tip shape of the second gas supply tube 728 differs from the tip shape of the second gas supply tube 628 illustrated in FIG. 11. An inner circumferential surface 728*b* of the second gas supply tube 728 is formed to have a diameter that progressively decreases toward an outlet 728*a*, and the channel area of a third channel 729 progressively decreases accordingly. The sheath gas $Gf_2$ flowing through the third channel 729 flows toward the outlet 728*a* such that the flow focuses while being restricted by the inner circumferential surface 728*b* of the second gas supply tube 728. The atomized and electrically charged droplets ejected from the nozzle 315 are enveloped in the sheath gas $Gf_2$ and focus onto the axial center along the ejection direction, and the focused, atomized and electrically charged droplets are ejected from the outlet 728*a* of the second gas supply tube 728. With this configuration, even if the nozzle 315 cannot eject atomized droplets with sufficient focusing thereof, the sprayer 711 can eject focused and atomized droplets.

[Analysis Device]

Figure 13:
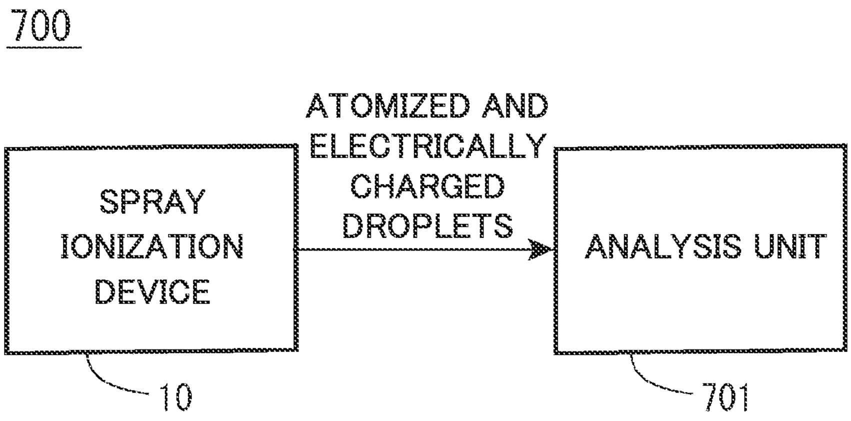
FIG. 13 is a diagram schematically illustrating a configuration of an analysis device according to an embodiment of the present invention.

FIG. 13 is a diagram schematically illustrating a configuration of an analysis device according to an embodiment of the present invention. Referring to FIG. 13, an analysis device 700 includes a spray ionization device 10 and an analysis unit 701 for introducing atomized and electrically charged droplets from the spray ionization device 10 and performing mass spectrometry or the like.

The spray ionization device 10 is selected from the spray ionization devices of the first and second embodiments described above. The spray ionization device 10 sends the ejected, atomized and electrically charged droplets of the sample liquid Lf to the analysis unit 701. The atomized and electrically charged droplets are introduced into the analysis unit 701 in a state in which the molecules, clusters, and the like of components contained in the sample liquid are electrically charged by evaporation of solvents.

In the case in which the analysis unit 701 is a mass spectrometer, the analysis unit 701 includes, for example, an ion lens, a quadrupole mass filter, and a detection unit (all not illustrated). The ion lens focuses ions of the components of the sample liquid Lf generated by the spray ionization device 10, the quadrupole mass filter separates out specific ions based on a mass-to-charge ratio, the detection unit detects the specific ions for each mass number, and outputs corresponding signals.

The spray ionization device 10 efficiently generates ions of components of the sample liquid and can therefore be used as an ion source of trace components. The analysis device 700 is a liquid chromatography-mass spectrometry (LC/MS) device including the spray ionization device 10 as an ion source.

Hereinafter, Measurement Examples using Examples 1 and 2 of the spray ionization devices according to the embodiments of the present invention will be described. As a Comparative Example, an ESI ion source using a gas spray assisted electrospray ionization (ESI) method was used.

Example 1 is the spray ionization device of the first variation of the first embodiment, in which the sprayer including the nozzle 115 illustrated in FIGS. 5A and 5B was used.

Example 2 is the spray ionization device of the first variation of the second embodiment, in which the sprayer including the nozzle 415 illustrated in FIGS. 9A and 9B was used. The inner diameter of the liquid supply tube 21 is 110 μm, the inner diameter of the gas supply tube is 170 μm, and the vertical and horizontal size of each aperture of the reticulated member is 35 μm.

A sprayer (ESI-probe (ion source)) attached to model API2000, a mass spectrometer manufactured by AB SCIEX, U.S.A. was used in the Comparative Example.

Measurement Example 1: Total Ionic Strength of Deoxyadenosine Monophosphate (dAMP) Solution Deoxyadenosine monophosphate (dAMP) was used as a solute, 10% acetonitrile aqueous solution was used as a solvent, and a dAMP solution having 50 ppm concentration was prepared as a sample solution. This sample solution was supplied into the sprayer of Examples 1 and 2 and the Comparative Example at a flow rate of 3 μL/min by a syringe pump. In Examples 1 and 2, a high-voltage power source (manufactured by AB SCIEX, Model API2000 equipment) was connected to the electrode, and DC voltage of 4.5 kV was applied to the sample solution. Total ionic strength was counted by the mass spectrometer (Model API2000 manufactured by AB SCIEX) for one second per measurement, measurement was performed five times, and an average value and a relative standard deviation (RSD) (%) (=average value/standard deviation×100) were calculated. Nitrogen gas was used as the spraying gas, nitrogen gas was supplied at 1 L/min in Examples 1 and 2, and nitrogen gas was supplied at a set value of 18 as a recommended value of the manufacturer of the mass spectrometer in the Comparative Example.

Figure 14:
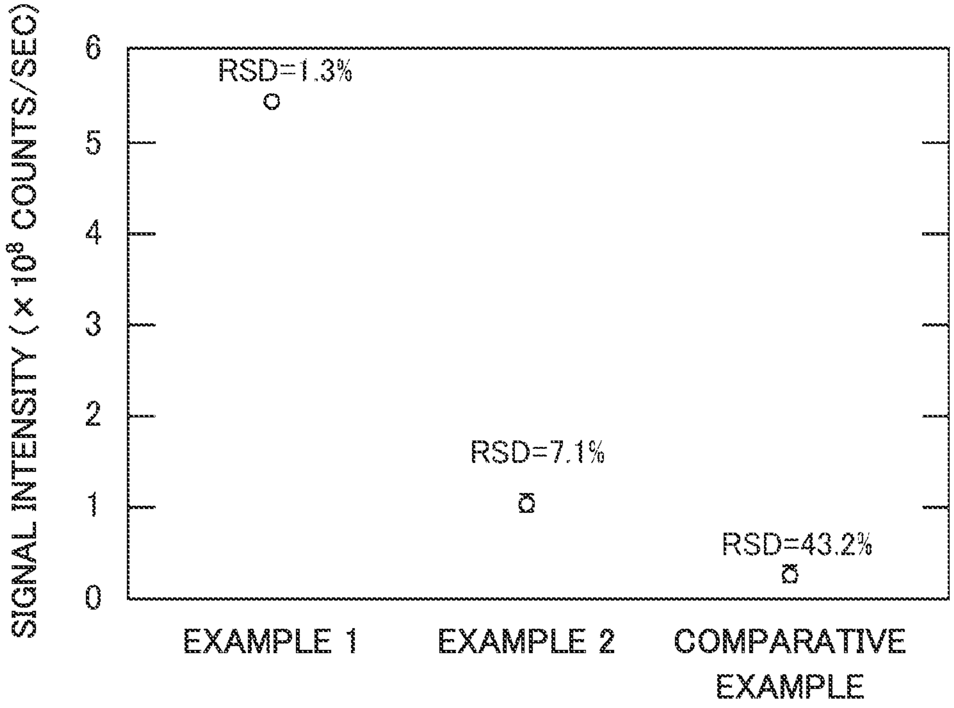
FIG. 14 is a diagram illustrating a Measurement Example of signal intensity of Examples 1 and 2 and a Comparative Example.

FIG. 14 is a diagram illustrating a Measurement Example of signal intensity of Examples 1 and 2 and the Comparative Example. FIG. 14 illustrates average values and RSD of the signal intensity. Referring to FIG. 14, the average values of the signal intensity of Examples 1 and 2 were $5.45\times10^8$ counts and $1.06\times10^8$ counts, respectively, which were 20 times and 3.8 times the intensity of the Comparative Example which was $2.76\times10^7$ count, respectively. This fact shows that the sprayers of Examples 1 and 2 were able to perform ionization extremely more efficiently than the sprayer of the Comparative Example and provide higher signal values. RSDs of the signal intensity of Examples 1 and 2 were 1.3% and 7.1%, respectively, and extremely smaller than RSD of the Comparative Example, which was 43.2%. This fact shows that the sprayers of Examples 1 and 2 were able to ionize dAMP extremely more stably than the sprayer of the Comparative Example.

Measurement Example 2: Signal Intensity of Acetonitrile Aqueous Solution

10% acetonitrile aqueous solution as a sample solution was supplied into the sprayers of Example 1 and the Comparative Example at a flow rate of 100 μL/min, signal intensity was counted for one second per measurement by the same mass spectrometer as in Measurement Example 1, measurement was performed six times, and an average value was calculated. Nitrogen gas was used as spraying gas, the flow rate was set to 1 L/min and 2 L/min, and the temperature was set to 25° C. and 100° C., in Example 1. A dryer was used for heating the spraying gas. In the Comparative Example, nitrogen gas of 100° C. and 300° C. was ejected from a heating gas nozzle attached to the mass spectrometer at a set value 30 as recommended by the manufacturer of the mass spectrometer. In Example 1, a high-voltage power source (manufactured by AB SCIEX, Model API2000 equipment) was connected to the electrode, and DC voltage of 4.5 kV was applied to the sample solution.

Figure 15A:
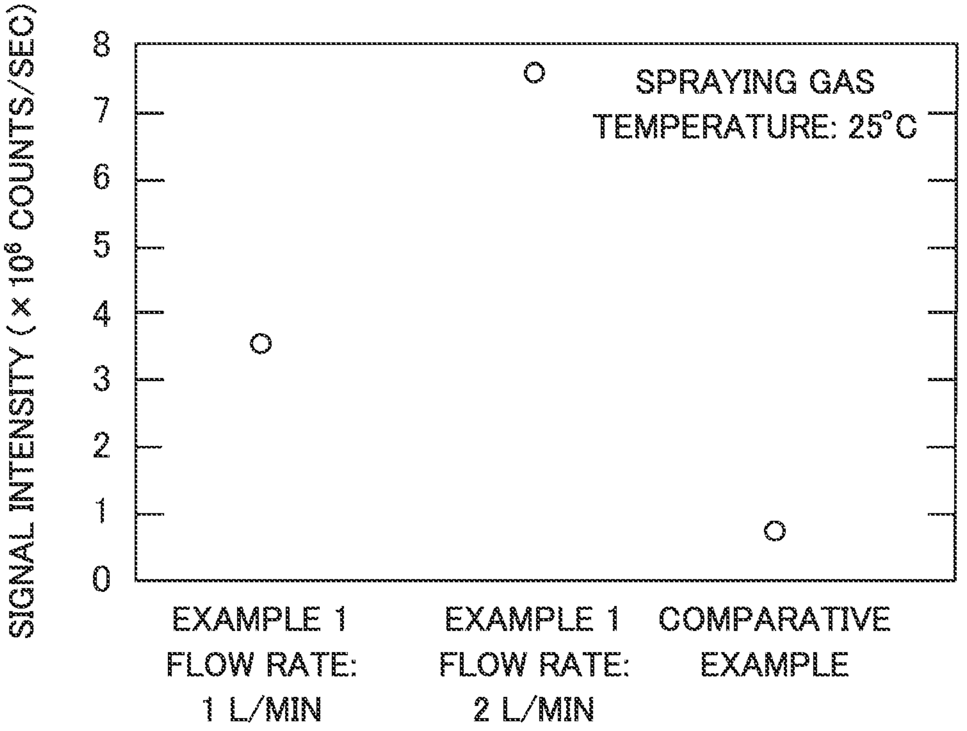
FIGS. 15A and 15B are diagrams illustrating another Measurement Example of signal intensity of Example 1 and the Comparative Example.
Figure 15B:
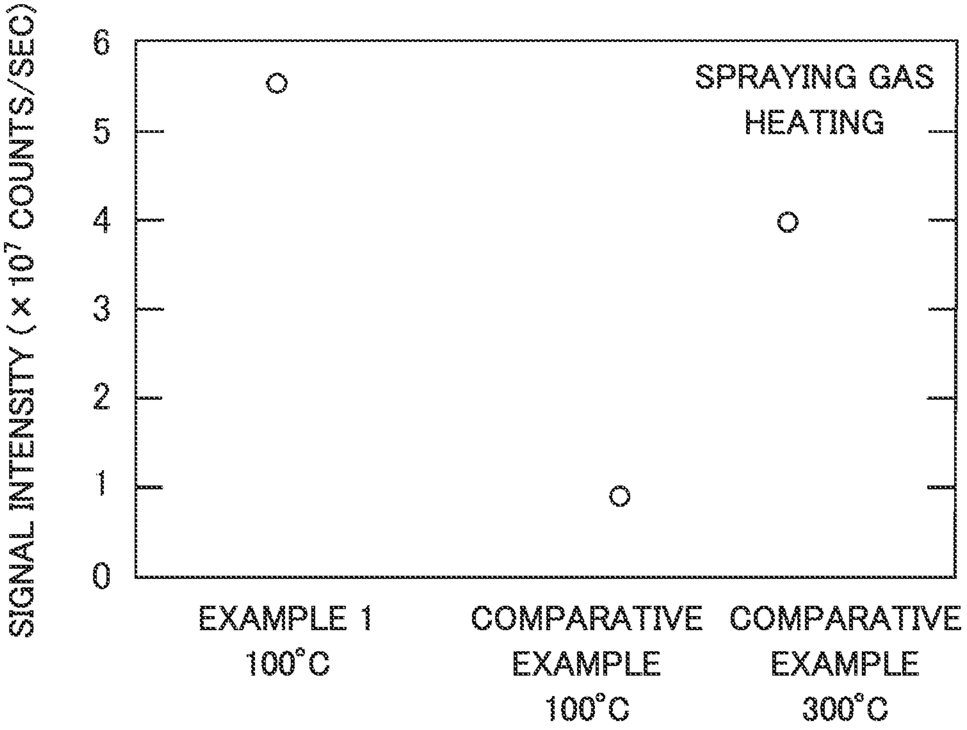

FIGS. 15A and 15B are diagrams illustrating another Measurement Example of signal intensity of Example 1 and the Comparative Example, in which FIG. 15A illustrates a case in which the spraying gas was at 25° C. and FIG. 15B illustrates a case in which the spraying gas was heated.

Referring to FIG. 15A, an average of the signal intensity of Example 1 was $3.56\times10^6$ counts and $7.60\times10^6$ counts at the flow rates of 1 L/min and 2 L/min, respectively, which were 5 times and 10 times the strength of the Comparative Example, which was $7.26\times10^5$ counts, respectively. This fact shows that the sprayer of Example 1 was able to perform ionization extremely more efficiently than the sprayer of the Comparative Example and provide higher signal values.

Referring to FIG. 15B, an average of the signal intensity was $5.54\times10^7$ counts for the spraying gas at 100° C. and the flow rate of 2 L/min of Example 1, which was 6 times and 1.4 times the intensity of the Comparative Example, which was $8.79\times10^6$ counts and $3.97\times10^7$ counts for the heated gas at 100° C. and 300° C., respectively. This fact shows that, even in the case in which the ejection gas was heated, the sprayer of Example 1 was able to perform ionization extremely more efficiently than the sprayer of the Comparative Example and provide higher signal values.

Measurement Example 3: Application to Liquid Chromatography-Mass Spectrometry (LC-MS)

5 μL of dAMP solution having 50 ppm concentration was introduced from an LC injector, 10% acetonitrile aqueous solution was supplied as an eluent via a reversed phase column (Model XBridge BEH C18 manufactured by Waters), both solutions were ejected by the sprayer of Example 1 and the Comparative Example, and signals of dAMP (mass-to-charge ratio m/z=330) were obtained by a mass spectrometer (Model API2000 manufactured by AB SCIEX). Nitrogen gas was used as spraying gas, and the flow rate was set to 2 L/min for the sprayer of Example 1. The spraying gas was heated in the same manner as in Measurement Example 2. In Example 1, a high-voltage power source (manufactured by AB SCIEX, Model API2000 equipment) was connected to the electrode, and DC voltage of 4.5 kV was applied to the sample solution.

Figure 16:
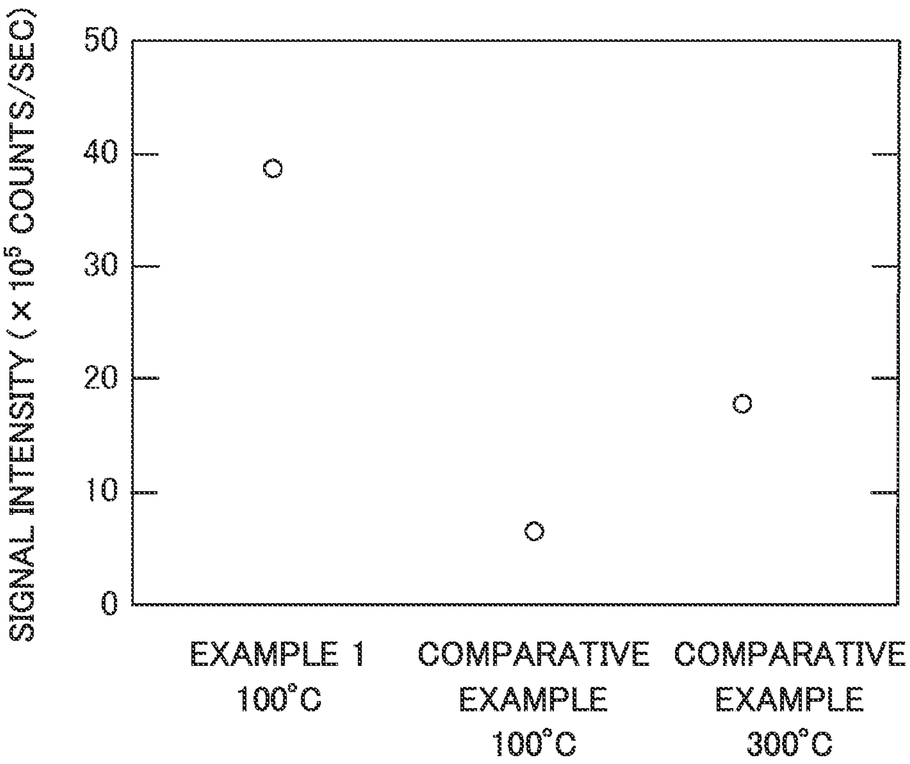
FIG. 16 is a diagram illustrating a Measurement Example of specific signal intensity of Example 1 and the Comparative Example.

FIG. 16 is a diagram illustrating a Measurement Example of signal intensity of dAMP of Example 1 and the Comparative Example. Referring to FIG. 16, the signal intensity of Example 1 was $3.9\times10^6$ counts, which was six times the intensity of the Comparative Example which was $6.5\times10^5$ counts for the gas heated to 100° C., and twice the intensity of the Comparative Example which was $1.8\times10^6$ counts for the gas heated to 300° C. This fact shows that the sprayer of Example 1 was able to perform ionization extremely more efficiently than the sprayer of the Comparative Example and provide higher signal values.

In the foregoing, the preferred embodiments of the present invention have been described in detail; however, the present invention is not limited to the specific embodiments, and various modifications and changes can be made within the scope of the present invention described in the claims.

The shape of the cross-section and the channel of the liquid supply tube has been described as circular, but may be triangular, square, pentagonal, hexagonal or other polygonal shapes, or other shapes such as an elliptical shape. The shape of the outer circumferential surface and the inner circumferential surface of the gas supply tube and the second gas supply tube can be selected from these shapes, depending on the shape of the liquid supply tube.

The spray ionization device of the present invention can be used as an ion source of various devices; for example, in the field of trace sample analysis, the spray ionization device can be used for mass spectrometry such as mass spectrometry of molecules in a biological sample, elemental analysis, chemical morphology analysis, and charged particle analysis.

In the field of surface treatment and granulation, the spray ionization device of the present invention can be used for surface coating devices utilizing surface coating techniques of spraying electrically charged droplets, and particle forming devices utilizing particle forming techniques by spraying electrically charged droplets of suspension.

In the field of food production, healthcare, and agriculture, the spray ionization device of the present invention can be used for space processing devices utilizing sterilization, deodorization, dust collection, and chemical reactions, utilizing gas-phase or spatial chemical reactions by spraying electrically charged droplets.

EXPLANATION OF REFERENCE NUMERALS

10, 610, 710: spray ionization device
11, 611, 711: sprayer
12: container
13, 613: cylinder
14: high-voltage power source
15, 65, 75, 115, 165, 175, 215, 315, 415, 515: nozzle
18, 118: electrode
19, 616, 619: heating unit
21: liquid supply tube
22, 122, 322, 422, 522: gas supply tube
23: first channel
24, 124, 324, 424, 524: second channel
26, 126, 326: constriction portion
127: protective tube
430: reticulated member
628, 728: second gas supply tube
629, 729: third channel
700: analysis device
701: analysis unit
Lf: sample liquid
Gf: spraying gas
$Gf_2$: sheath gas

What is claimed is:

1. A spray ionization device, comprising:

a first tube including a first channel through which a liquid can flow, the first tube including a first outlet for ejecting the liquid at one end;

a second tube surrounding the first tube with a gap and including a second channel through which a gas can flow, the second tube including a second outlet at the one end, the second channel being defined by an outer circumferential surface of the first tube and an inner circumferential surface of the second tube; and an electrode that can contact the liquid flowing through the first channel, the electrode being provided only at a supply end of the first tube such that a distal end of the electrode projects into the first channel from an inner circumferential surface of the first tube and/or forms a surface contiguous with the inner circumferential surface of the first tube, and capable of applying voltage to the liquid by way of a power source connected to the electrode, wherein at the one end, the second outlet is arranged further toward a tip than the first outlet, at least a portion of the inner circumferential surface of the second tube has a diameter that progressively decreases toward the second outlet, and a diameter of the inner circumferential surface of the second outlet is equal to or greater than an opening diameter of the first outlet, and electrically charged droplets of the liquid can be ejected from the second outlet.

2. The spray ionization device according to claim 1, wherein the second channel includes a constriction portion arranged upstream of the first outlet, and a channel area of the second channel progressively decreases from the opposite end to the constriction portion.

3. The spray ionization device according to claim 2, wherein the first outlet of the first tube has an opening diameter smaller than the diameter of the inner circumferential surface of the second tube in the constriction portion.

4. The spray ionization device according to claim 1, further comprising:

a third tube between the first tube and the second tube, the third tube surrounding the first tube and including a third outlet at the one end, wherein the second channel through which the gas can flow is defined by an outer circumferential surface of the third tube and the inner circumferential surface of the second tube, and at the one end, a tip of the third tube is arranged further toward the opposite end than the first outlet.

5. The spray ionization device according to claim 4, wherein the third tube includes an other constriction portion formed by a tip of the outer circumferential surface at the one end of the third tube and the inner circumferential surface of the second tube.

6. The spray ionization device according to claim 5, wherein the second tube is formed such that at least a portion of the inner circumferential surface of the second tube has a diameter that progressively decreases from a portion of the other constriction portion toward the second outlet.

7. The spray ionization device according to claim 4, wherein, at a tip at the one end of the third tube, a dielectric material fills a gap between an inner circumferential surface of the third tube and the outer circumferential surface of the first tube.

8. The spray ionization device according to claim 1, further comprising:

a source of the gas; and a heating unit for heating the gas between the source and a supply port provided at the opposite end of the first tube.

9. The spray ionization device according to claim 1, wherein the electrode is an electrical conductor material provided so as to be exposed in the first channel or an electrical conductor material forming at least a portion of the first tube.

10. The spray ionization device according to claim 1, further comprising:

a high-voltage power source connected to the electrode, wherein the high-voltage power source applies voltage in a range of 0.5 kV to 10 kV to the electrode.

11. The spray ionization device according to claim 1, further comprising: a fourth tube surrounding the second tube with a gap and including a third channel through which a second gas can flow, the fourth tube including a third outlet at the one end, the third channel being defined by the outer circumferential surface of the second tube and an inner circumferential surface of the third tube.

12. The spray ionization device according to claim 11, wherein, at the one end, the third outlet is arranged further toward the tip than the second outlet, and an inner circumferential surface of the fourth tube has a diameter that at least progressively decreases toward the third outlet.

13. The spray ionization device according to claim 11, further comprising: a second heating unit for heating the second gas or electrically charged droplets of the liquid ejected from the second outlet together with the second gas enveloping the electrically charged droplets of the liquid.

14. An analysis device, comprising:

the spray ionization device according to claim 1; and an analysis unit that introduces and analyzes the electrically charged droplets sprayed from the spray ionization device.

15. A surface coating device comprising the spray ionization device according to claim 1.

* * * * *